US012384664B2

(12) United States Patent
Karashima et al.

(10) Patent No.: US 12,384,664 B2
(45) Date of Patent: Aug. 12, 2025

(54) CONTROLLER, BOOM DEVICE, AND TRUCK CRANE

(71) Applicant: TADANO LTD., Kagawa (JP)

(72) Inventors: Daiki Karashima, Kagawa (JP); Satoshi Tanii, Kagawa (JP)

(73) Assignee: TADANO LTD., Kagawa (JP)

(*) Notice: Subject to any disclaimer, the term of this patent is extended or adjusted under 35 U.S.C. 154(b) by 272 days.

(21) Appl. No.: 18/037,600

(22) PCT Filed: Oct. 11, 2021

(86) PCT No.: PCT/JP2021/037562
§ 371 (c)(1),
(2) Date: May 18, 2023

(87) PCT Pub. No.: WO2022/107493
PCT Pub. Date: May 27, 2022

(65) Prior Publication Data

US 2024/0025707 A1 Jan. 25, 2024

(30) Foreign Application Priority Data

Nov. 18, 2020 (JP) ................................ 2020-191733

(51) Int. Cl.
*B66C 13/00* (2006.01)
*B66C 13/46* (2006.01)
(Continued)

(52) U.S. Cl.
CPC .............. *B66C 13/48* (2013.01); *B66C 13/46* (2013.01); *B66C 23/42* (2013.01); *B66C 23/88* (2013.01); *B66C 2700/0371* (2013.01)

(58) Field of Classification Search
CPC ......... B66C 13/46; B66C 13/48; B66C 23/42; B66C 23/88; B66C 23/585; B66C 2700/0371
See application file for complete search history.

(56) References Cited

U.S. PATENT DOCUMENTS 10,604,387 B2 * 3/2020 Hamaguchi ............. B66C 13/46
2021/0221654 A1 7/2021 Yodawara et al.

FOREIGN PATENT DOCUMENTS

EP 0812797 A1 12/1997
JP H07172775 A 7/1995
(Continued)

OTHER PUBLICATIONS

International Search Report and Written Opinion issued in International Pat. Appl. No. PCT/JP2021/037562, dated Oct. 29, 2021.
(Continued)

*Primary Examiner* — Emmanuel M Marcelo
(74) *Attorney, Agent, or Firm* — MARSHALL, GERSTEIN & BORUN LLP

(57) ABSTRACT

A controller calculates a theoretical payout length X1(θ) of a wire in a posture in which a hook block is raised, a theoretical payout length X2(θ) of the wire in a posture in which the hook block is lying, dX1(θ)/dt, and dX2(θ)/dt, using a length L of the boom, A and B (first specified values) indicating coordinates of a hook hardware, a length K (second specified value) being a sum of a length of the hook block and a length of a hook hardware, and a derricking angle θ of the boom. The controller makes the boom stand and lie at a constant speed of F=dθ/dt, and makes a winch drive at a wind-up speed of J×{dX1(θ)/dt+dX2(θ)/dt}/2 taking J×{X1(θ)+X2(θ)}/2 as a target value.

9 Claims, 16 Drawing Sheets

(51) Int. Cl.

| | |
|---|---|
| ***B66C 13/48*** | (2006.01) |
| ***B66C 23/42*** | (2006.01) |
| ***B66C 23/88*** | (2006.01) |

(56) References Cited

FOREIGN PATENT DOCUMENTS

| | | | | | |
|---|---|---|---|---|---|
| JP | H07179291 | A | * | 7/1995 | ............ B66C 13/23 |
| JP | H07187568 | A | * | 7/1995 | ............ B66C 23/00 |
| JP | H08259182 | A | * | 10/1996 | ............ B66C 23/88 |
| JP | 2000086165 | A | * | 3/2000 | |
| JP | 3818556 | B2 | * | 9/2006 | |
| JP | 2016008103 | A | * | 1/2016 | |
| KR | 101384576 | B1 | * | 4/2014 | |
| WO | WO-2020027335 | A1 | | 2/2020 | |

OTHER PUBLICATIONS

International Preliminary Report on Patentability issued in International Pat. Appl. No. PCT/JP2021/037562, dated Jun. 1, 2023.
Extended European Search Report for EP Application No. 21894367.8 dated Oct. 1, 2024.

* cited by examiner $$\text{FUNCTION } X1(\theta) = \overline{SQ} - K = \sqrt{(L\cos\theta - A)^2 + (L\sin\theta - B)^2} - K$$

$$\frac{d}{dt}X1(\theta) = \frac{d\theta}{dt}\frac{d}{d\theta}X1(\theta) = F\frac{d}{d\theta}X1(\theta)$$

$$\text{FUNCTION } X2(\theta) = \overline{SR} = \sqrt{(L\cos\theta - A - K)^2 + (L\sin\theta - B)^2}$$

$$\frac{d}{dt}X2(\theta) = \frac{d\theta}{dt}\frac{d}{d\theta}X2(\theta) = F\frac{d}{d\theta}X2(\theta)$$

$$\text{FUNCTION } X1(\theta) = \overline{SQ} - K$$

$$= \sqrt{(L\cos\theta - A)^2 + (L\sin\theta - B)^2 + C^2} - K$$

$$\frac{d}{dt} X1(\theta) = \frac{d\theta}{dt}\frac{d}{d\theta} X1(\theta) = F \frac{d}{d\theta} X1(\theta)$$

$$\text{FUNCTION } X2(\theta) = \overline{SR}$$

$$= \sqrt{(L\cos\theta - A - K)^2 + (L\sin\theta - B)^2 + C^2}$$

$$\frac{d}{dt}X2(\theta) = \frac{d\theta}{dt}\frac{d}{d\theta}X2(\theta) = F\frac{d}{d\theta}X2(\theta)$$

$$\text{FUNCTION } Y1(\theta) = \overline{NQ'} - \eta$$
$$= \sqrt{(M\cos\theta - \alpha)^2 + (M\sin\theta - \beta)^2} - \eta$$

$$\frac{d}{dt}Y1(\theta) = \frac{d\theta}{dt}\frac{d}{d\theta}Y1(\theta) = F\frac{d}{d\theta}Y1(\theta)$$

$$\text{FUNCTION } Y2(\theta) = \overline{NR'}$$

$$= \sqrt{(M\cos\theta - \alpha - \eta)^2 + (M\sin\theta - \beta)^2}$$

$$\frac{d}{dt}Y2(\theta) = \frac{d\theta}{dt}\frac{d}{d\theta}Y2(\theta) = F\frac{d}{d\theta}Y2(\theta)$$

CONTROLLER, BOOM DEVICE, AND TRUCK CRANE

TECHNICAL FIELD

The present invention relates to a truck crane, more specifically to a boom device equipped to the truck crane and a controller that controls the boom device.

BACKGROUND ART

A truck crane is generally equipped with a boom device (see Japanese Patent Application Laid-Open No. Hei 7-172775). A boom device disclosed in Japanese Patent Application Laid-Open No. Hei 7-172775 includes a boom capable of extending and retracting, a boom drive unit, a winch having a wire drum around which a wire is wound, a winch drive unit, a load hanging hook provided to a tip end of the wire, and a hook fixing ring. The boom is supported by a slewing base so as to be capable of standing and lying. The boom drive unit makes the boom extend, retract, stand, and lie. The wire is pulled out from the wire drum and wound around a tip end of the boom, and an end portion of the wire is provided with the load hanging hook. The winch drive unit drives the winch, and the wire is wound up by the wire drum or paid out from the wire drum. The hook fixing ring is provided to the slewing base, and the load hanging hook is hung on and fixed to the hook fixing ring when the crane is traveling (not working).

The boom device disclosed in Japanese Patent Application Laid-Open No. Hei 7-172775 includes a control device. The control device controls the boom drive unit and the winch drive unit in order to safely perform a boom retracting work at the end of a work and a boom extending work at the start of the work. For example, at the boom retracting work, a worker makes the boom retract and stand, and hangs the load hanging hook on the hook fixing ring. Next, the worker operates the boom drive device to make the boom lie. At this time, the control device controls the boom drive unit and the winch drive unit so that the wire is wound up according to lying of the boom in order to prevent slack of the wire.

Specifically, based on a wire length S detected by a sensor that detects the length of the wire and a derricking angle θ of the boom detected by a derricking angle sensor, the control device controls drive of the winch so that the two values have an ideal correspondence D, in other words, so that the wire is not too slack and not too tight. The ideal correspondence relationship D is determined by experiments using actual devices or simulations, and is stored in advance in a storage unit of the control device.

The above-described ideal correspondence D changes depending on a geometry configured by the length of the boom in a retracted state, a position of a tip end position (position of a portion around which the wire is wound) of the boom, a position of a derricking center of the boom, a position of the hook fixing ring, and the like. Thus, the above-described ideal correspondence D is determined for each type of the boom device, and so the control device also has to be designed for each type of the boom device.

SUMMARY OF THE INVENTION

Accordingly, a main object of the present invention is to provide a controller capable of safely and automatically extending/retracting a boom at a start and an end of crane work, irrespective of a type of a boom device.

(1) A controller according to the present invention is mounted on a boom device including a pedestal, a boom supported by the pedestal and capable of performing a derricking motion between a lying position and a predetermined standing position, a winch having a wire wound up by a wire drum and wound around a tip end portion of the boom, a hook member having a load hanging hook provided to the wire, a first actuator configured to make the boom stand and lie, a second actuator configured to drive the winch, a locking member provided to the pedestal, wherein the load hanging hook is locked to the locking member, a derricking angle sensor configured to output a detection value in accordance with a derricking angle of the boom, and a wire sensor configured to output a detection value in accordance with a payout length of the wire. The controller has a memory configured to store in advance a length of the boom, a first specified value in accordance with a position of the locking member taking a derricking center of the boom as a reference, and a second specified value in accordance with at least one of a type of the hook member and a type of the locking member, and the controller is configured to execute a generation process for generating an allowable minimum distance and an allowable maximum distance from a tip end reference position of the boom to the hook member, based on the derricking angle of the boom specified from the detection value of the derricking angle sensor, the length of the boom, the first specified value, and the second specified value, and a drive process for making the first actuator and the second actuator drive so that the payout length of the wire specified from the detection value of the wire sensor becomes a predetermined target value that is not smaller than the allowable minimum distance and not larger than the allowable maximum distance.

The payout length of the wire at which the locking member is not damaged and an irregular winding does not occur when the boom is made to stand and lie is, for example, a length at which the hook member is in a posture between a posture in which the hook member is pulled up by the wire wound up by the wire drum and a lying posture in which the hook member is not pulled up by the wire. The controller calculates the allowable minimum distance (theoretical distance when the hook member is in the pulled-up posture) and the allowable maximum distance (theoretical distance when the hook member is in the lying posture), based on the derricking angle of the boom, the length of the boom, the first specified value, and the second specified value. The controller makes the winch drive while making the boom stand and lie via the first actuator and the second actuator so that a predetermined target value that is not larger than the calculated allowable minimum distance and not smaller than the calculated allowable maximum distance is achieved. In addition, since the length of the boom, the first specified value, and the second specified value stored in the memory are values in accordance with a type of the boom, a type of the load hanging hook, and a type of the locking member, the controller can generate the allowable minimum distance and the allowable maximum distance and can set the target value, irrespective of the type of the boom, the type of the hook member, and the type of the locking member. Therefore, the boom is safely and automatically extended/retracted irrespective of the type of the boom device. Furthermore, the controller according to the present invention can be used in various boom devices.

(2) The allowable minimum distance may be a distance from the tip end portion of the boom to the hook member in a posture in which the wire is wound up and the hook member is pulled up, and the allowable maximum distance may be a distance from the tip end portion of the boom to the hook member in a posture in which the hook member is lying.

(3) The drive process may include a first process for making the boom stand and lie at a predetermined speed, and a second process for making the second actuator drive so that the payout length of the wire specified from the detection value of the wire sensor becomes the predetermined target value.

Since the boom stands and lies at the predetermined speed, a control target in order for the payout length of the wire to be the predetermined target value can be limited to the second actuator.

(4) The predetermined target value may be an average value of the allowable maximum distance and the allowable minimum distance.

(5) The controller may be configured to further execute a stop process for stopping the drive process, based on determining that the payout length of the wire specified from the detection value of the wire sensor is outside a range from the allowable minimum distance to the allowable maximum distance.

When the payout length of the wire specified from the detection value of the wire sensor is outside the range from the allowable minimum distance to the allowable maximum distance, drive of the first actuator and the second actuator is stopped. For example, when the payout length of the wire is outside the range from the allowable minimum distance to the allowable maximum distance due to a trouble of the second actuator, standing and lying of the boom and drive of the winch are stopped. As a result, safety in an automatic extension and an automatic retraction of the boom is improved.

(6) The controller may be configured to further execute an obtaining process for obtaining a number of hanging wires, and to determine the predetermined target value based on the number of hanging wires.

The controller determines the predetermined target value based on the obtained number of hanging wires. Therefore, the controller according to the present invention can safely perform the automatic extension and the automatic retraction of the boom, even for the boom and the hook member with respect to which the number of hanging wires can be changed.

(7) The controller may be configured to further execute a correction process for correcting the allowable minimum distance and the allowable maximum distance, based on the derricking angle specified from the detection value of the derricking angle sensor and a radius of a winch sheave stored in the memory.

When the derricking angle of the boom changes, a contact position between the winch sheave and the wire changes, and as a result, the payout length of the wire from the wire drum changes. The change amount in the payout length of the wire depends on the derricking angle of the boom and the radius of the winch sheave. The controller corrects the allowable minimum distance and the allowable maximum distance based on the derricking angle specified from the detection value of the derricking angle sensor and the radius of the winch sheave. Therefore, the controller according to the present invention can perform the automatic extension and the automatic retraction of the boom more safely.

(8) A boom device according to the present invention includes the controller, and the pedestal, the boom, the winch, the hook member, the first actuator, the second actuator, the locking member, the derricking angle sensor, and the wire sensor.

The present invention can also be understood as a boom device.

(9) A truck crane according to the present invention includes the boom device.

The present invention can also be understood as a truck crane.

The controller according to the present invention can safely and automatically extend/retract the boom at a start and an end of crane work, irrespective of the type of the boom device.

DETAILED DESCRIPTION

Figure 1:
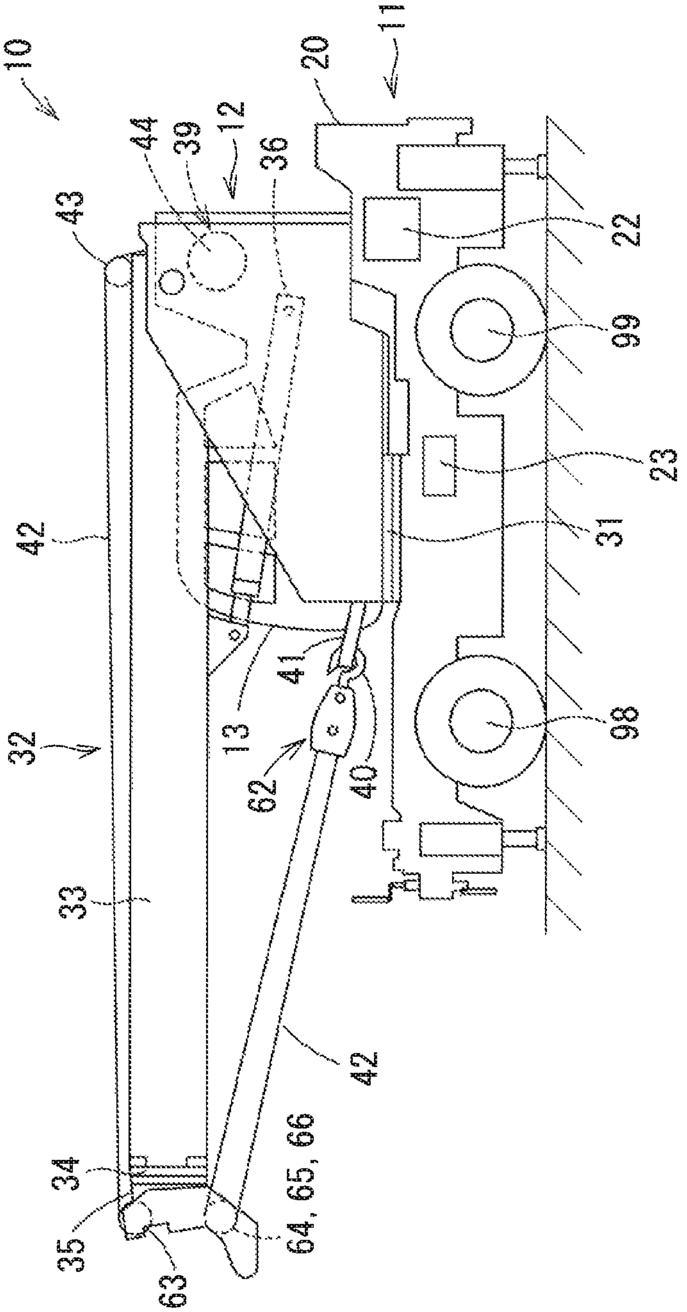
FIG. 1 is a schematic diagram of a truck crane 10 according to one embodiment of the present invention.

Hereinafter, preferred embodiments of the present invention will be described referring to the drawings appropriately. Note that it is needless to say that the present embodiment is merely one aspect of the present invention, and that aspects may be modified without changing the gist of the present invention. For example, an execution order of each process to be described later can be modified appropriately without changing the gist of the present invention. Alternatively, a part of the processes to be described later can be omitted appropriately without changing the gist of the present invention.

FIG. 1 schematically shows a truck crane 10 according to the present embodiment, showing a state in which a boom 32 is in a lying position.

The truck crane 10 mainly includes a traveling body 11, a boom device 12 mounted on the traveling body 11, and a cabin 13. The traveling body 11 includes a vehicle body 20, and an engine 22 and a battery 23 mounted on the vehicle body 20. The engine 22 rotationally drives axles 98, 99 via a transmission and the like (not shown). The engine 22 drives a hydraulic pump (not shown) included in a hydraulic supply device 24 (see FIG. 5), and the hydraulic supply device 24 generates hydraulic pressure for driving the boom device 12, and the like.

The cabin 13 is mounted on a slewing base 31 of the boom device 12. The cabin 13 has a driving device 14 (see FIG. 5) for driving the truck crane 10 and a steering device 15 (see FIG. 5) for steering the boom device 12. In other words, the truck crane 10 is a so-called rough-terrain crane, and driving of the truck crane 10 and steering of the boom device 12 are performed in the one cabin 13. However, the truck crane 10 may be a so-called all-terrain crane.

Figure 5:
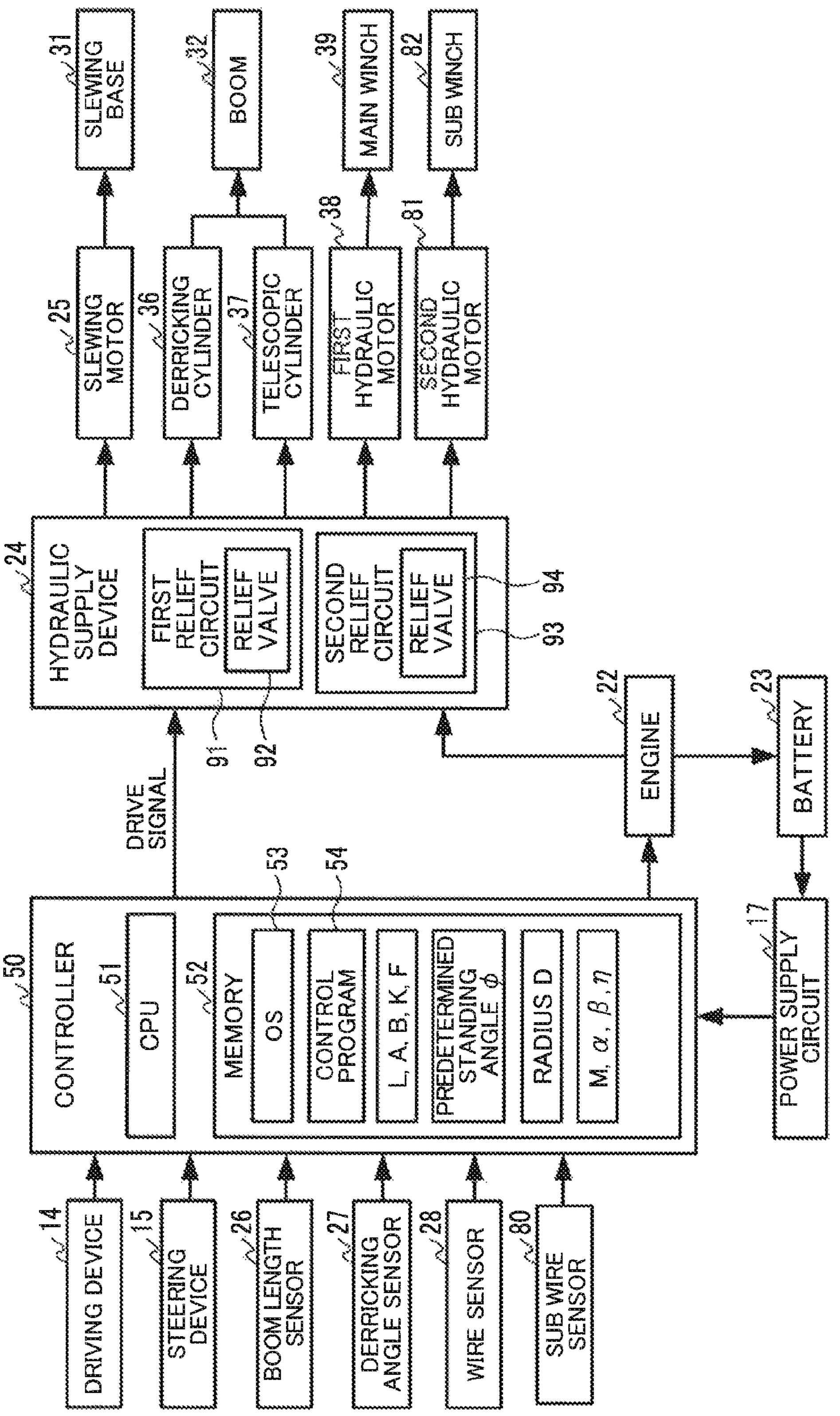
FIG. 5 is a functional block diagram of the truck crane 10.

The steering device 15 shown in FIG. 5 has operation levers, operation buttons, and the like for operating the boom device 12. The steering device 15 outputs operation signals indicating operation directions and operation amounts of the operation levers, and operation signals indicating whether the operation buttons are operated. The operation signals output by the steering device 15 are input to a controller 50.

The cabin 13 has a control box (not shown). The control box includes a control board. Microcomputers, resistors, capacitors, diodes, and various ICs are mounted on the control board, and constitutes the controller 50 and a power supply circuit 17.

Figure 2:
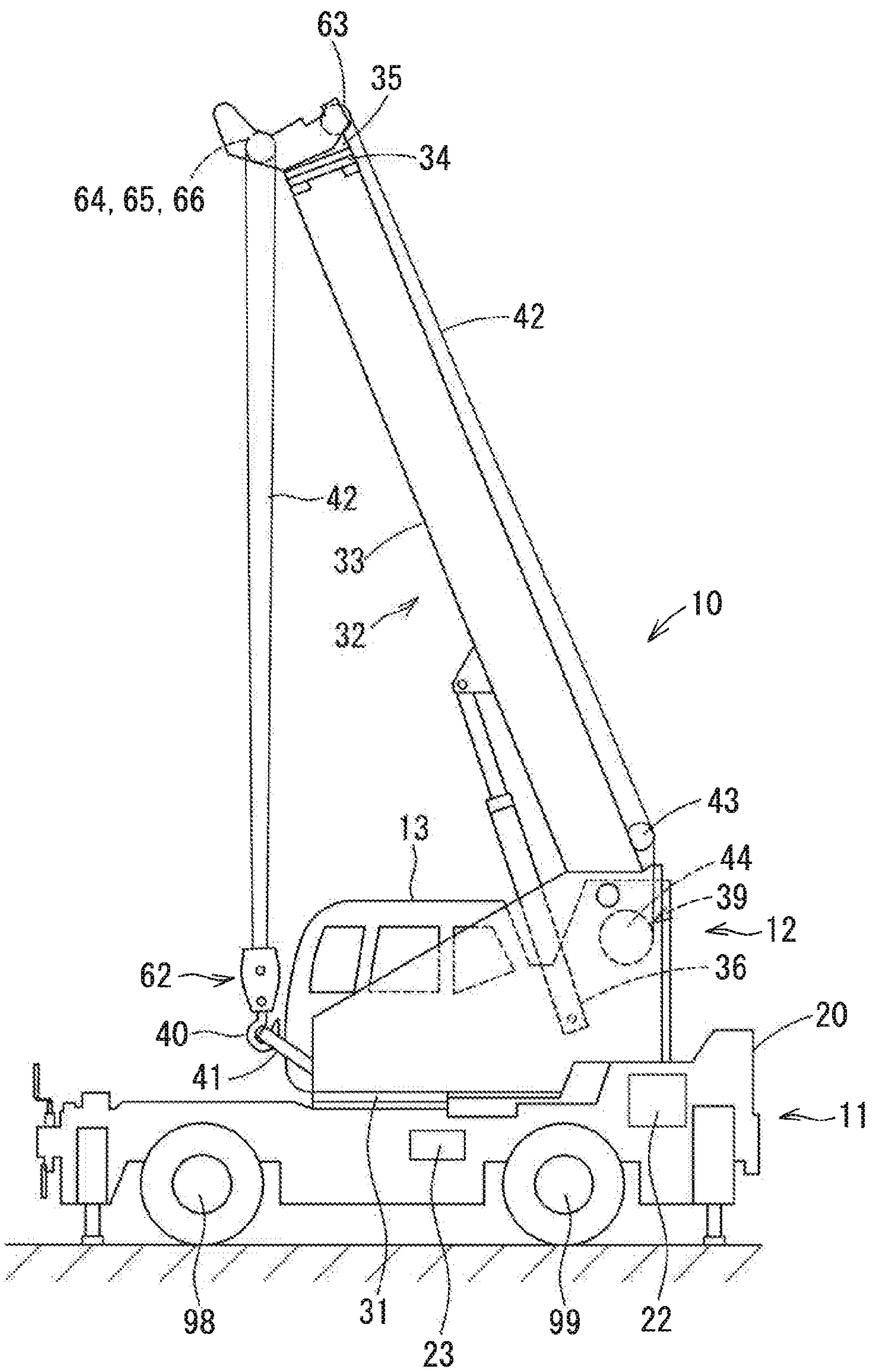
FIG. 2 is a schematic diagram of the truck crane 10 (a boom 32 is in a predetermined standing posture).

As shown in FIG. 1, the boom device 12 includes the slewing base 31, a boom 32, and the hydraulic supply device 24 (see FIG. 5). The slewing base 31 is supported by the vehicle body 20 so as to be capable of slewing. The slewing base 31 corresponds to a "pedestal" recited in the claims. The boom 32 has a base end boom 33, one or a plurality of intermediate boom(s) 34, and a tip end boom 35. The base end boom 33, the intermediate boom(s) 34, and the tip end boom 35 are arranged in a nested manner, and form a telescopic structure. The base end boom 33 is supported by the slewing base 31 so as to be capable of standing and lying, and therefore the boom 32 can slew, stand, lie, extend, and retract. The boom 32 extends and retracts between a retracted state shown in FIG. 1 and an extended state (not shown), and stands and lies between the lying position shown in FIG. 1 and a predetermined standing position shown in FIG. 2. The truck crane 10 travels in a retracted state (see FIG. 1) in which the boom 32 is in the retracted state and in the lying position.

As shown in FIG. 5, the boom device 12 further includes a slewing motor 25, a derricking cylinder 36 that makes the boom 32 stand and lie, and a telescopic cylinder 37 that makes the boom 32 extend and retract. The slewing motor 25 is provided to the vehicle body 20 (see FIG. 1). The slewing motor 25 rotates, receiving supply of the hydraulic pressure from the hydraulic supply device 24, and makes the slewing base 31 slew. The derricking cylinder 36 is provided to the slewing base 31. The derricking cylinder 36 extends and retracts, receiving supply of the hydraulic pressure from the hydraulic supply device 24. The derricking cylinder 36 that extends and retracts makes the boom 32 stand and lie. The derricking cylinder 36 corresponds to a "first actuator" recited in the claims. The telescopic cylinder 37 is provided to the boom 32. The telescopic cylinder 37 extends and retracts, receiving supply of the hydraulic pressure from the hydraulic supply device 24. The telescopic cylinder 37 that extends and retracts makes the boom 32 extend and retract.

The boom device 12 further includes a first hydraulic motor 38, a main winch 39, a pulley mechanism 60 (see FIG. 3), and a hook hardware 41 (see FIG. 1). The main winch 39 corresponds to a "winch" recited in the claims.

The main winch 39 is attached to a base end of the boom 32. The main winch 39 has a wire drum 44, a winch sheave 43, and a wire 42. The wire 42 is wound around the wire drum 44. The winch sheave 43 is located above the base end of the boom 32 in a state in which the boom 32 is in the lying position along the horizontal direction. The wire 42 pulled out from the wire drum 44 is wound around the winch sheave 43, and then is pulled out to the pulley mechanism 60 (see FIG. 3).

The first hydraulic motor 38 rotates, receiving supply of the hydraulic pressure from the hydraulic supply device 24. The first hydraulic motor 38 that rotates makes the wire drum 44 rotate. The wire drum 44 that rotates winds up the wire 42 (hoist up) or pays out the wire 42 (hoist down). The first hydraulic motor 38 corresponds to a "second actuator" recited in the claims.

Figure 3:
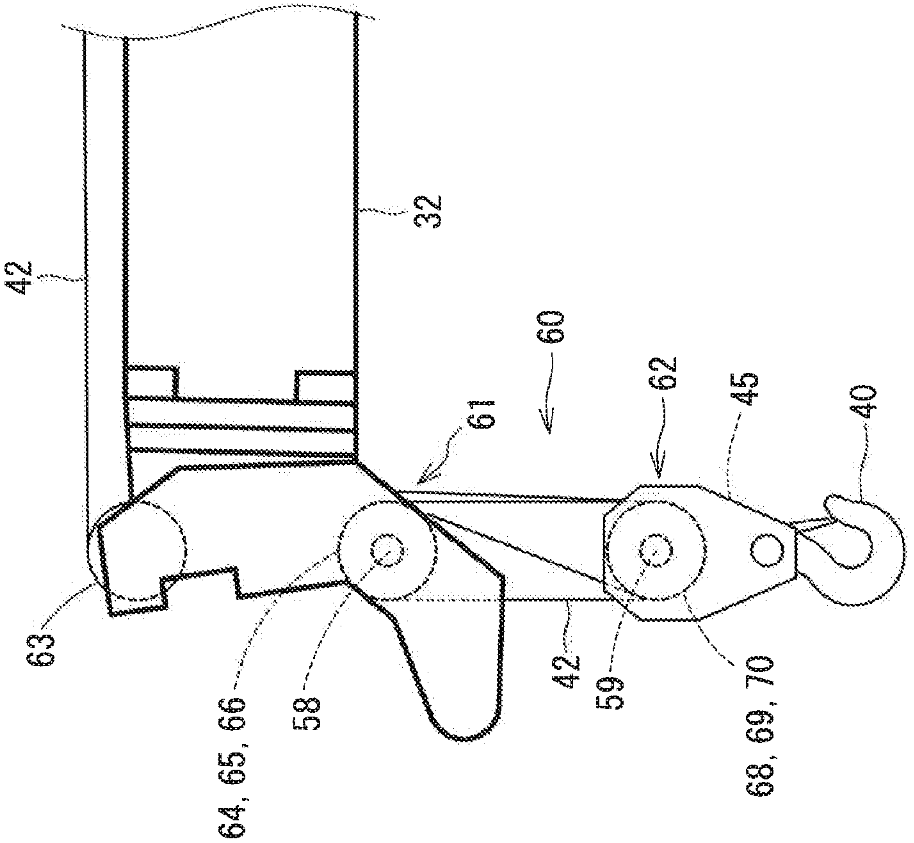
FIG. 3 is a diagram schematically showing a pulley mechanism 60 of the truck crane 10.

As shown in FIG. 3, the pulley mechanism 60 has a fixed sheave block 61 and a hook block 62.

The fixed sheave block 61 has one first sheave 63 and three second sheaves 64, 65, 66. The first sheave 63 is rotatably supported by a central shaft (not shown). The second sheaves 64, 65, 66 are supported by a central shaft 58 (see FIG. 4). The second sheaves 64, 65, 66 have a disc-shape, and are rotatable around the central shaft 58.

Figure 4:
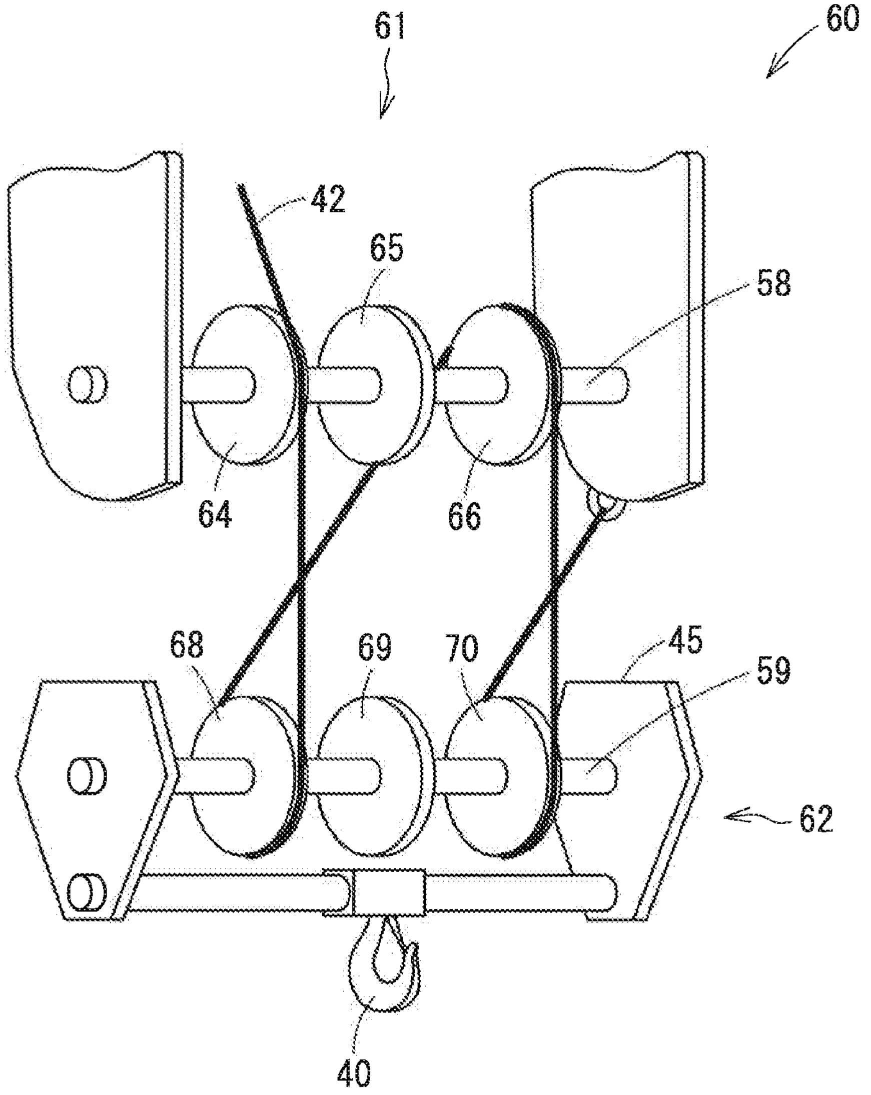
FIG. 4 is a diagram schematically showing a structure of the pulley mechanism 60.

As shown in FIG. 1, the first sheave 63 is located above a tip end of the boom 32 in the state in which the boom 32 is in the lying position along the horizontal position. The three second sheaves 64, 65, 66 are located below the tip end of the boom 32 in the lying position. As shown in FIG. 4, the three second sheaves 64, 65, 66 are provided side by side in a width direction of the boom 32. Note that although an example is shown in which the fixed sheave block 61 has the three second sheaves 64, 65, 66 in the present embodiment, the fixed sheave block 61 may have two second sheaves, or may have four or more second sheaves.

The hook block 62 has a frame 45, a load hanging hook 40 attached to the frame 45, and three third sheaves 68, 69, 70. The third sheaves 68, 69, 70 are supported by a central shaft 59 held by the frame 45, and are provided side by side in the horizontal direction (width direction of the boom 32). The third sheaves 68, 69, 70 have a disc-shape, and are rotatable around the above-described central shaft 59. Note that the hook block 62 may have two third sheaves, or may have four or more third sheaves. The hook block 62 corresponds to a "hook member" recited in the claims.

The wire 42 pulled out from the winch sheave 43 (see FIG. 1) is wound around the first sheave 63, and then is wound around the second sheave of the fixed sheave block 61 and the third sheave of the hook block 62. In the example shown in FIG. 4, the wire 42 is wound around the second sheave 64, the third sheave 68, the second sheave 66, and the third sheave 70. In other words, a number of hanging wires, which is the number of times the wire 42 is wound around the pulley mechanism 60, is "4". By increasing the number of hanging wires, maximum lifting load of the boom device 12 is increased.

The hook hardware 41 shown in FIG. 1 is engaged with the load hanging hook 40, and can fix the load hanging hook 40. One end portion of the hook hardware 41 is rotatably supported by the slewing base 31. The load hanging hook 40 is hung on the other end portion of the hook hardware 41. The hook hardware 41 is located directly below the tip end of the boom 32 in a state in which the boom 32 is made to stand to the predetermined standing position and is fully retracted. The hook hardware 41 fixes the load hanging hook 40 so that the load hanging hook 40 does not move while the truck crane 10 is traveling. The hook hardware 41 corresponds to a "locking member" recited in the claims.

The hydraulic supply device 24 shown in FIG. 5 is mounted on the traveling body 11. The hydraulic supply device 24 supplies hydraulic oil having a predetermined pressure to the slewing motor 25, the derricking cylinder 36, the telescopic cylinder 37, the first hydraulic motor 38, and other actuators (hereinafter also referred to as the slewing motor 25 and the like).

The hydraulic supply device 24 includes an electromagnetic-type flow path switching valve (not shown). The flow path switching valve operates by a drive signal input from the controller 50 to be described later. The slewing motor 25 and the like are driven by operating the flow path switching valve and changing a hydraulic supply line. In other words, the controller 50 controls drive of the slewing motor 25 and the like by outputting the drive signal.

In addition to a normal circuit (not shown) that supplies the hydraulic oil having the predetermined pressure to the first hydraulic motor 38, the hydraulic supply device 24 includes a first relief circuit 91 that relieves the hydraulic oil in order to reduce the pressure of the supplied hydraulic oil to be smaller than the predetermined pressure. The first relief circuit 91 has a relief valve 92. The relief valve 92 switches a flow path between the normal circuit and the first relief circuit 91 by the drive signal input from the controller 50. In other words, the controller 50 can change the pressure of the hydraulic oil supplied to the first hydraulic motor 38 by inputting the drive signal to the relief valve 92. The controller 50 changes the pressure of the hydraulic oil supplied to the first hydraulic motor 38 in a boom extending process (see FIG. 6) and a boom retracting process (see FIG. 7) to be described later.

As shown in FIG. 5, the boom device 12 further includes a boom length sensor 26, a derricking angle sensor 27, and a wire sensor 28.

The boom length sensor 26 is a sensor that outputs a detection value in accordance with a length of the boom 32. The boom length sensor 26 may be a sensor that directly detects the length of the boom 32 or a sensor that detects an extension length of the telescopic cylinder 37. In other words, the boom length sensor 26 may be any sensor for detecting physical quantity that changes in accordance with the length of the boom 32.

The derricking angle sensor 27 is a sensor that outputs a detection value in accordance with a derricking angle of the boom 32. The derricking angle sensor 27 may be a sensor that directly detects the derricking angle of the boom 32 or may be a sensor that detects an extension length of the derricking cylinder 36. In other words, the derricking angle sensor 27 may be any sensor for detecting physical quantity that changes in accordance with the derricking angle of the boom 32. The derricking angle sensor 27 is a tilt sensor or a horizontal sensor that is attached to the boom 32 and outputs an angle with respect to the horizontal plane, for example.

The wire sensor 28 is a rotary encoder that detects a rotation amount of the wire drum 44 (see FIGS. 1 and 2), for example. The wire sensor 28 outputs a pulse signal having a voltage value that changes in accordance with the rotation of the wire drum 44. The wire sensor 28 is connected to the controller 50 by a signal line such as a cable. The controller 50 calculates the rotation amount of the wire drum 44 from the number of pulses input from the wire sensor 28, and calculates a payout length of the wire 42 based on the rotation amount of the wire drum 44 and a radius of the wire drum 44. The radius of the wire drum 44 is stored in advance in a memory 52 to be described later. Note that any type of sensor may be used as the wire sensor 28, as long as the controller 50 can obtain the payout length of the wire 42.

The power supply circuit 17 is a circuit that generates power to be supplied to the controller 50 and the like. The power supply circuit 17 is a DC-DC converter, for example. The power supply circuit 17 converts a direct-current voltage supplied from the battery 23 to a stable direct-current voltage having a predetermined voltage value, and outputs the direct-current voltage.

The controller 50 includes a CPU 51, which is a central processing unit, and the memory 52. The memory 52 is configured by ROMs, RAMs, EEPROMs, and the like, for example.

The CPU 51, the memory 52, the boom length sensor 26, the derricking angle sensor 27, and the wire sensor 28 are connected to a communication bus (not shown) included in the controller 50. Through the communication bus, a control program 54 executed by the CPU 51 reads information and data from the memory 52, stores information and data in the memory 52, and obtains detection values output from the boom length sensor 26, the derricking angle sensor 27, and the wire sensor 28.

The memory 52 stores an OS 53, which is an operating system, the control program 54 that controls drive of the boom device 12, a length L of the boom 32 (hereinafter referred to as "boom length L"), first specified values A and B, a second specified value K, an angular velocity constant F, and a predetermined standing angle (p. The OS 53 and the control program 54 are executed by the CPU 51 in a pseudo-parallel manner by so-called multitask processing.

The boom length L is, for example, the length of the boom 32 when the boom 32 is fully retracted, and is the length from the base end to the tip end of the boom 32. The base end of the boom 32 is a position of a derricking center P (see FIG. 8) of the boom 32. The tip end of the boom is a position of the central shaft of the second sheaves 64, 65, 66 (see FIG. 1) around which the wire 42 is wound, for example.

Figure 8:
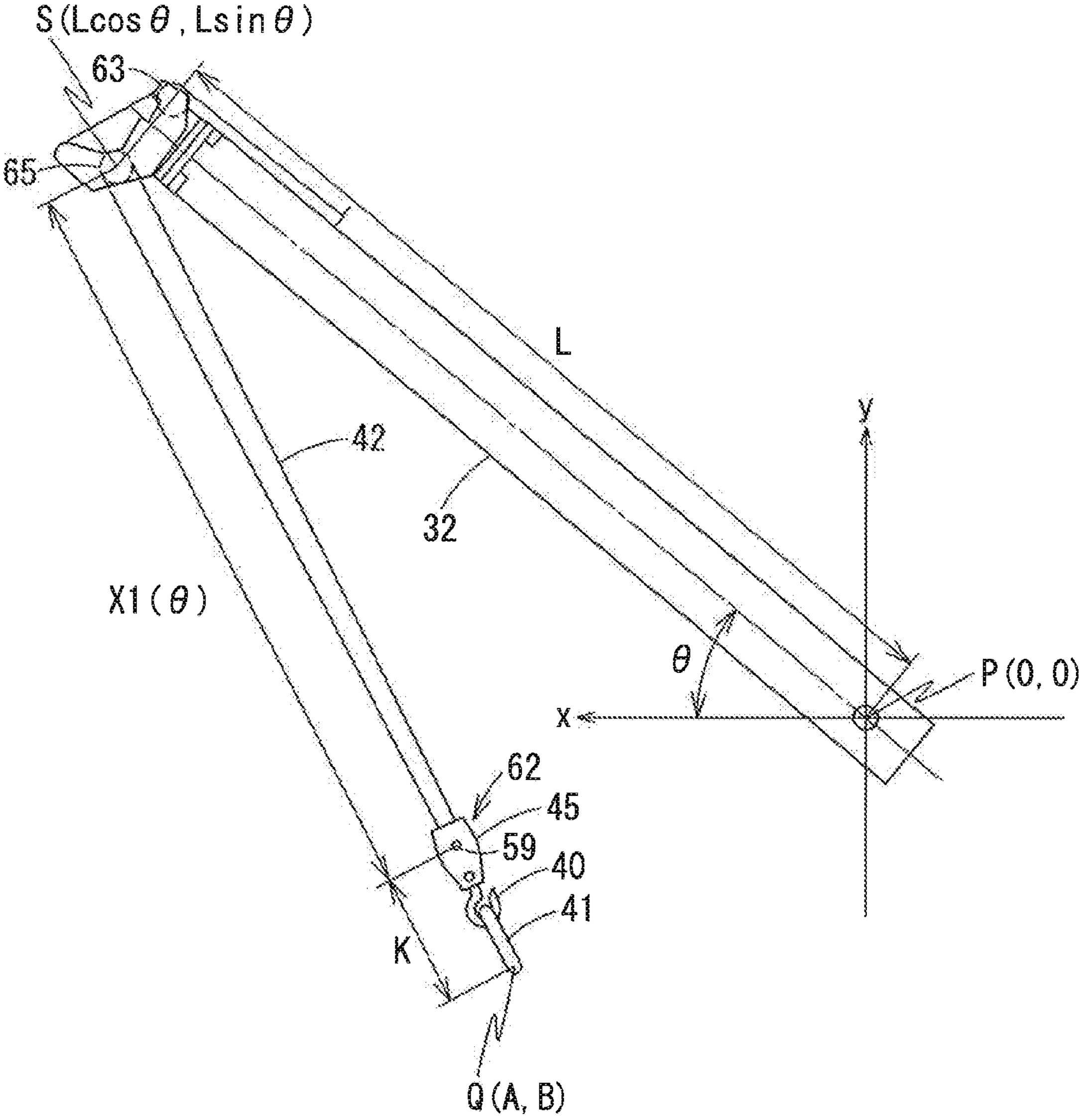
FIG. 8 is a diagram for explaining a function X1(θ) indicating a theoretical payout length of a wire 42.

The first specified values A and B indicate coordinates of a point Q shown in FIG. 8. In other words, the coordinates of the point Q are (A, B). The point Q indicates a position of one end of the hook hardware 41 in a two-dimensional coordinate system taking the derricking center P as the origin. Note that the two-dimensional coordinate system is a coordinate system in which a front-back direction of the truck crane 10 is taken as an x-axis direction and an up-down direction is taken as a y-axis direction.

The second specified value K is the sum of the length of the hook block 62 and the length of the hook hardware 41. The length of the hook block means a distance from a tip end of the load hanging hook 40 to the central shaft 59. Note that when the length of the hook block 62 is so short to be ignorable, the second specified value K is considered to be the length of the hook hardware 41, and when the length of the hook hardware 41 is so short to be ignorable, the second specified value K is considered to be the length of the hook block 62. In other words, the second specified value K is a value in accordance with at least one of the type of the hook block 62 and the type of the hook hardware 41. Note that the length of the hook hardware 41 and the length of the load hanging hook 40 may be separately stored in the memory 52. In that case, the control program 54 calculates the second specified value K by adding the length of the load hanging hook 40 to the length of the hook hardware 41.

The angular velocity constant F is an angular velocity of the boom 32 when the control program 54 makes the boom 32 stand and lie at a constant angular velocity in the boom extending process (see FIG. 6) and the boom retracting process (see FIG. 7) to be described later. In other words, $F=d\theta/dt$.

The predetermined standing angle $\varphi$ is a derricking angle of the boom 32 at the predetermined standing position in which the tip end of the boom 32 is located directly above the hook hardware 41. The predetermined standing angle $\varphi$ is used in the boom extending process (see FIG. 6) to determine whether the boom 32 stands to the predetermined standing position in which the load hanging hook 40 can be safely removed from the hook hardware 41.

The control program 54 has a class, for example. In other words, the class is stored in the memory 52. The class generates an instance (object). Specifically, by being provided with the boom length L, the first specified values (A, B), and the second specified value K stored in the memory 52, the class generates, as an instance, a function $X1(\theta)$ shown in FIG. 8, $d/dt\{X1(\theta)\}$ obtained by differentiating the function $X1(\theta)$ with respect to time t, a function $X2(\theta)$ shown in FIG. 9, and $d/dt\{X2(\theta)\}$ obtained by differentiating the function $X2(\theta)$ with respect to time t. Note that the control program 54 may generate $d/dt\{X1(\theta)\}$ and $d/dt\{X2(\theta)\}$ by differentiating the generated functions $X1(\theta)$ and $X2(\theta)$ with respect to time t. Furthermore, the above-described class may be arithmetic expressions that generate $X1(\theta)$ and $X2(\theta)$ by inputting the boom length L, the first specified values (A, B), and the second specified value K to input fields.

As shown in FIG. 8, the function $X1(\theta)$ indicates a theoretical payout length of the wire 42 in a state in which the hook block 62 and the hook hardware 41 are aligned on a straight line. The function $X1(\theta)$ indicates the theoretical payout length of the wire 42 in a case in which the derricking angle of the boom 32 is θ. The function $X1(\theta)$ is expressed using A, B, L, K, and 0, taking 0 as a variable and taking the above-described A, B, L, and K as constants.

Describing in detail, coordinates of a point S indicating a position of the tip end of the boom 32 are expressed as ($L\cos\theta$, $L\sin\theta$) using the length L of the boom 32 and the derricking angle θ of the boom 32. Therefore, the distance SQ between the point S and the point Q is expressed using A, B, L, K and θ, as shown in FIG. 8. Then, the function $X1(\theta)$ is the distance SQ−K, and is expressed using A, B, L, K, and θ.

Figure 9:
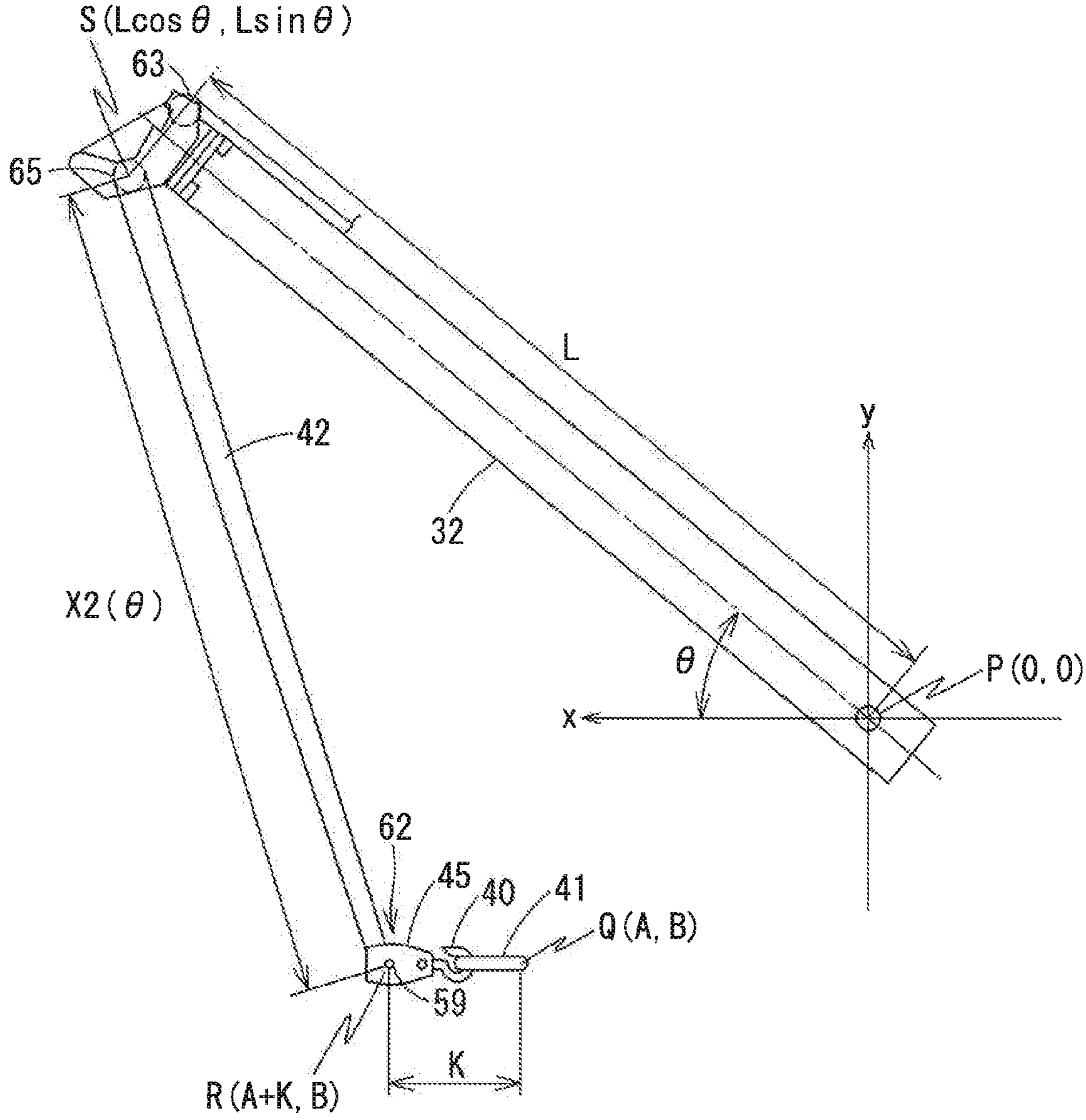
FIG. 9 is a diagram for explaining a function X2(θ) indicating a theoretical payout length of the wire 42.

As shown in FIG. 9, the function $X2(\theta)$ indicates a theoretical payout length of the wire 42 in a posture in which the hook block 62 is lying. The posture in which the hook block 62 is lying is a state in which the hook block 62 is supported by the vehicle body 20 and extends along the horizontal direction. Furthermore, the function $X2(\theta)$ indicates the theoretical payout length of the wire 42 in the case in which the derricking angle of the boom 32 is θ. The function $X2(\theta)$ is expressed using A, B, L, K, and θ, taking 0 as a variable and taking the above-described A, B, L, and K as constants.

Describing in detail, the coordinates of the point S indicating the position of the tip end of the boom 32 are expressed as ($L\cos\theta$, $L\sin\theta$). Coordinates of a point R indicating a connection position between the wire 42 and the load hanging hook 40, in other words, coordinates of the central shaft 59 can be expressed as (A+K, B). The function $X2(\theta)$ is the distance SR between the point S and the point R, and is expressed using A, B, L, K and θ as shown in FIG. 9. The function $X1(\theta)$ corresponds to an "allowable minimum distance" recited in the claims. The function $X2(\theta)$ corresponds to an "allowable maximum distance" recited in the claims.

The control program 54 executes the boom extending process for automatically making the boom 32 in the lying position (see FIG. 1) stand to the predetermined standing position (see FIG. 2), and the boom retracting process for automatically making the boom 32 in the predetermined standing position lie to the lying position. Note that a process executed by the control program 54 is also a process executed by the controller 50.

When the truck crane 10 arrives at a work site, the control program 54 executes the boom extending process. In other words, the boom extending process is executed in order for the truck crane 10 to start working at the work site. Conventionally, this process has been manually performed by a worker using the steering device 15, however, in the present embodiment, the control program 54 automatically performs the work of extending the boom 32 to the predetermined standing position.

After the crane work is finished, the worker makes the control program 54 execute the boom retracting process. In other words, the boom retracting process is executed in order for the truck crane 10 to perform normal traveling at the work site. Conventionally, this process has been manually performed by the worker using the steering device 15, however, in the present embodiment, the control program 54 automatically performs the work of retracting the boom 32.

Hereinafter, the boom extending process and the boom retracting process will be described in detail referring to FIGS. 6 and 7.

After the truck crane 10 arrives at a work site, the worker performs, using the steering device 15, an operation to instruct execution of the boom extending process. Note that in a state in which the truck crane 10 arrives at the work site (see FIG. 1), the boom 32 is in the above-described retracted state and the load hanging hook 40 is fixed to the hook hardware 41.

Figure 6:
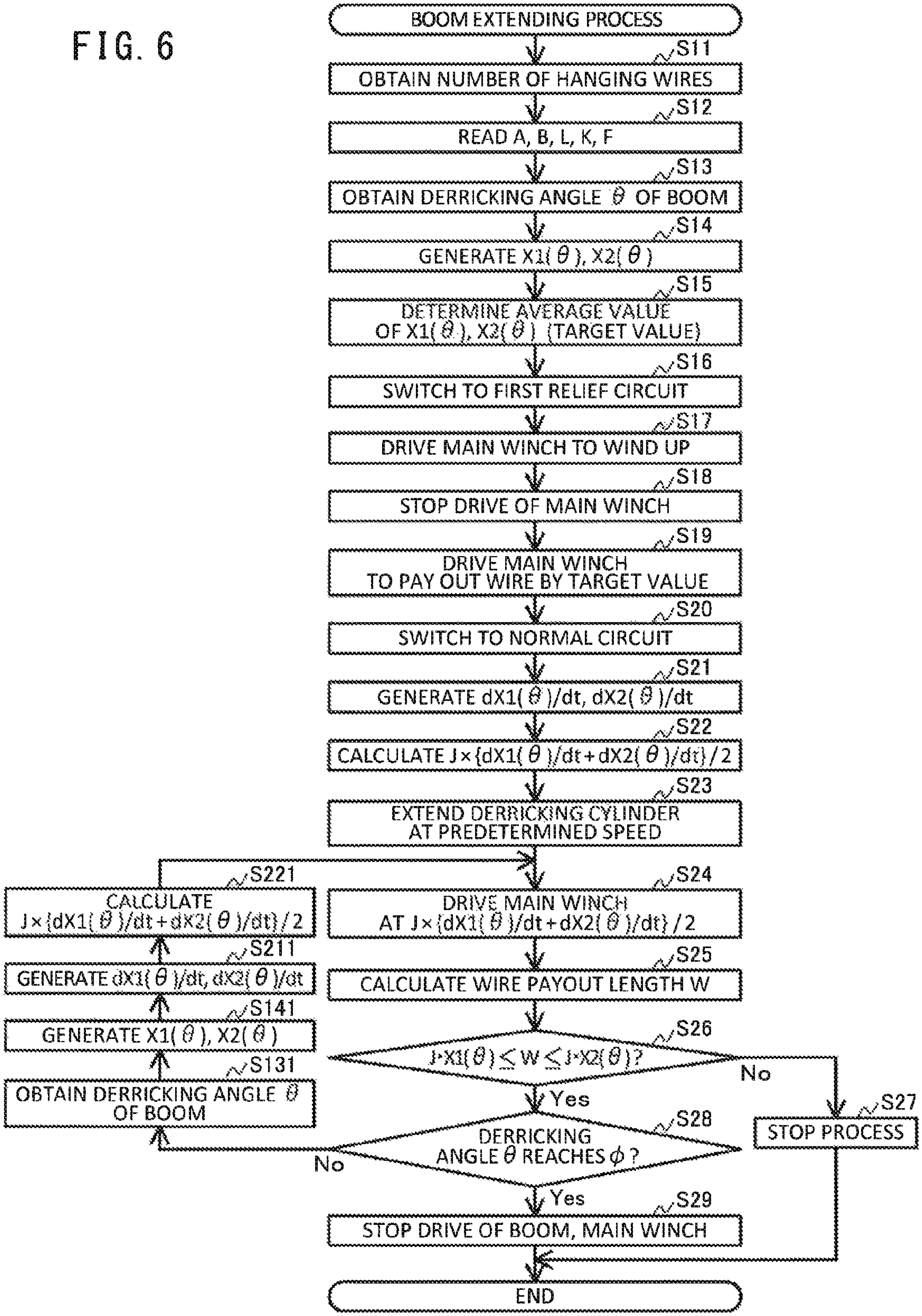
FIG. 6 is a flowchart of a boom extending process of the truck crane 10.
Figure 7:
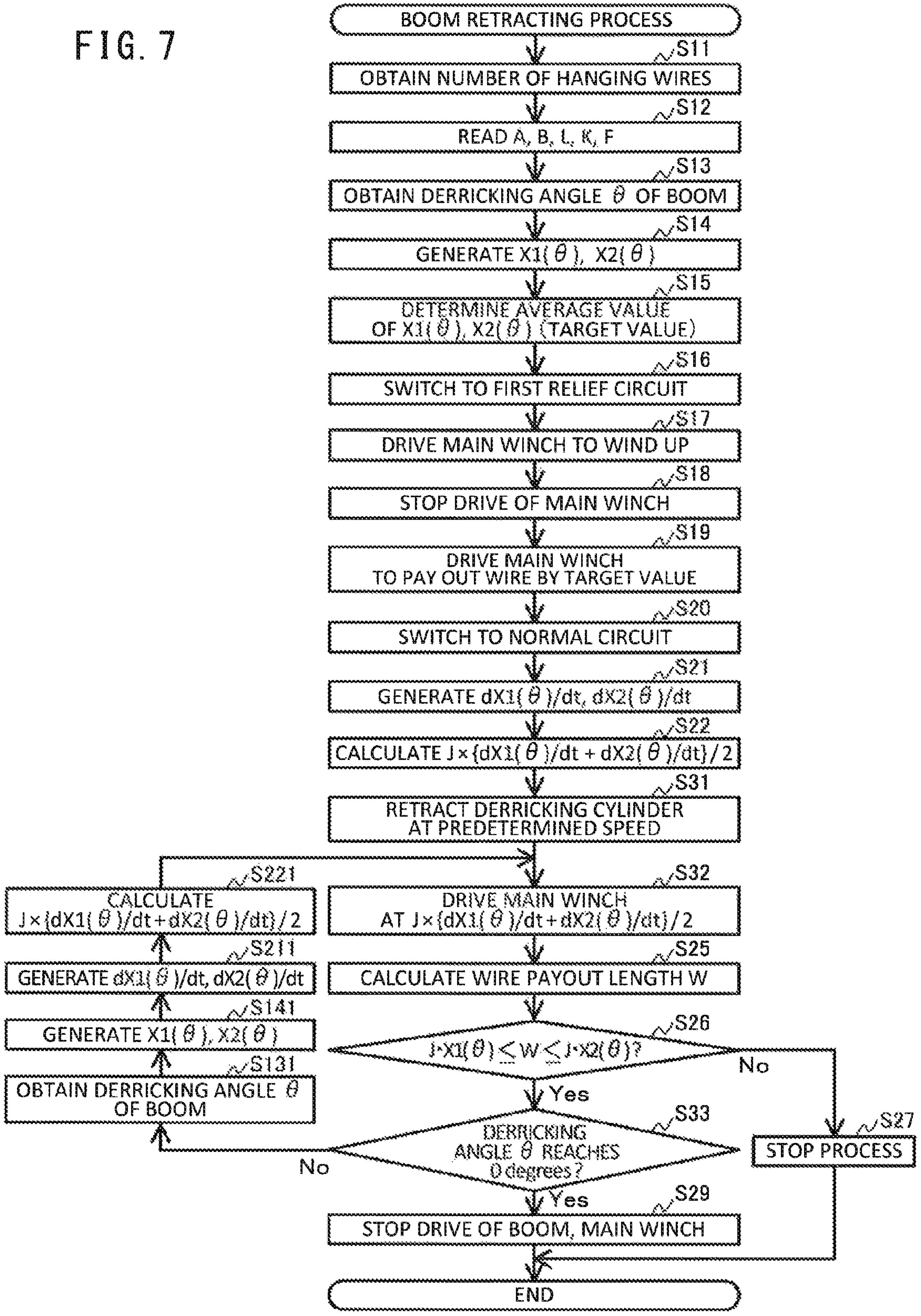
FIG. 7 is a flowchart of a boom retracting process of the truck crane 10.

The control program 54 starts execution of the boom extending process shown in FIG. 6 in accordance with inputting of the operation signal instructing to execute the boom extending process from the steering device 15. At first, the control program 54 obtains the number of hanging wires (S11). For example, the control program 54 reads the number of hanging wires stored in the memory 52. Alternatively, the control program 54 executes a process for automatically determining the number of hanging wires and obtains the number of hanging wires. The process of step S11 corresponds to an "obtaining process" recited in the claims.

Note that although not described in the flowchart, when the length of the boom 32 detected by the boom length sensor 26 is not "L" stored in the memory 52, the control program 54 may perform an error display and may cancel execution of the boom extending process. With this, the boom extending process can be prevented from being executed in a state in which the boom 32 is not retracted.

Next, the control program 54 reads the above-described A, B, L, K, and F from the memory 52 (S12). Furthermore, the control program 54 obtains the derricking angle θ detected by the derricking angle sensor 27 (S13). The control program 54 generates $X1(\theta)$ and $X2(\theta)$ using the obtained θ, A, B, L, K, and F and the above-described class (S14). The process of step S14 corresponds to a "generation process" recited in the claims.

The control program 54 determines a target value using the generated X1(θ) and X2(θ) (S15). Specifically, the control program 54 calculates {X1(θ)+X2(θ)}/2, which is the average value of X1(θ) and X2(θ), as the target value. The control program 54 multiplies the calculated target value by a correction coefficient J to correct the target value. The correction coefficient J is the number of hanging wires obtained in step S11. For example, when the number of hanging wires is "4", J=4.

The control program 54 switches the flow path of the hydraulic oil from the above-described normal circuit to the first relief circuit 91 via the relief valve 92 to reduce the hydraulic pressure supplied to the first hydraulic motor 38 to be smaller than the predetermined pressure (S16). When the flow path is switched to the first relief circuit 91 and the pressure of the hydraulic oil supplied to the first hydraulic motor 38 becomes smaller than the predetermined pressure, tension generated on the wire 42 to be wound up becomes small, and the hook hardware 41 is prevented from being damaged in a subsequent step S17.

The control program 54 drives the main winch 39 via the first hydraulic motor 38, and winds up the wire 42 (S17). By winding up the wire 42, the hook block 62 becomes a posture in which the hook block 62 is pulled up by the wire 42 (see FIG. 8).

The control program 54 makes drive of the main winch 39 stop after the hook block 62 becomes the pulled-up posture, in other words, after the payout length of the wire 42 becomes the above-described allowable minimum distance X1(θ) (S18). For example, the control program 54 calculates a rotation speed of the wire drum 44 or a payout speed of the wire 42 from the detection value detected by the wire sensor 28, determines that the hook block 62 is in the pulled-up posture based on the fact that the calculated rotation speed or payout speed becomes zero, and makes drive of the main winch 39 stop. Alternatively, the control program 54 makes drive of the main winch 39 stop based on the fact that elapsed time after driving the main winch 39 reaches a predetermined time stored in advance in the memory 52.

Alternatively, when a tension sensor that detects a tension applied to the wire 42 is provided, the control program 54 makes drive of the main winch 39 stop based on the fact that the tension detected by the tension sensor reaches a predetermined tension stored in advance in the memory 52.

The control program 54 drives the main winch 39 via the first hydraulic motor 38, and pays out the wire 42 by the target value determined in step S15 (S19). Specifically, the control program 54 drives the main winch 39, counts the pulse signals output by the wire sensor 28, and makes drive of the main winch 39 stop based on the fact that the payout length of the wire 42 indicated by the count value reaches the above-described target value.

Figure 10:
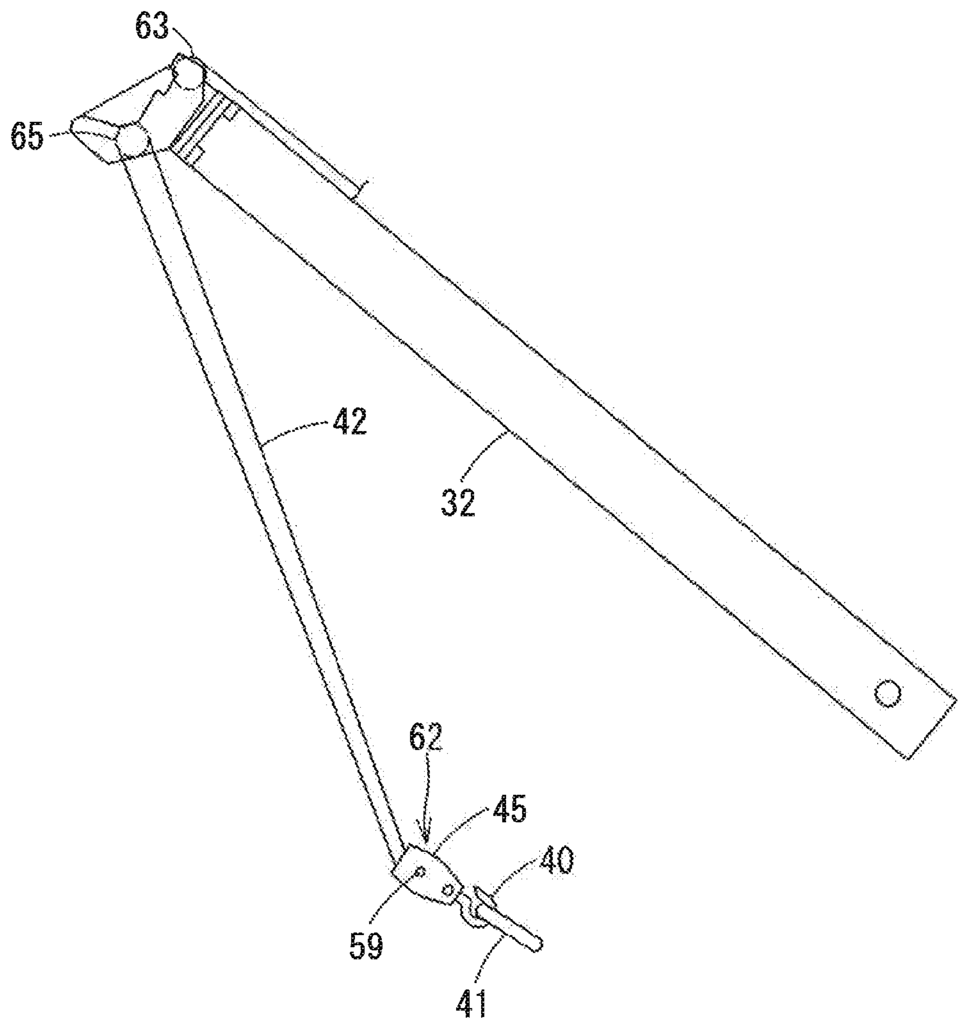
FIG. 10 is a diagram showing a state in which a hook block 62 is in an intermediate posture.

By executing step S19, the hook block 62 becomes an intermediate posture (see FIG. 10) between the above-described pulled-up posture and the above-described lying posture. If the hook block 62 is in the intermediate posture, a wind-up allowance of the wire 42 can be obtained until the hook hardware 41 is damaged due to the tension generated on the wire 42, and a payout allowance can be obtained until the wire 42 becomes loose and an irregular winding occurs. Note that the irregular winding means a state in which the wire 42 is irregularly wound up by the wire drum 44, and the like.

The control program 54 switches the flow path of the hydraulic oil from the first relief circuit 91 to the above-described normal circuit via the relief valve 92, and sets the hydraulic pressure supplied to the first hydraulic motor 38 to the predetermined pressure (S20). The control program 54 generates dX1(θ)/dt and dX2(θ)/dt using the derricking angle θ obtained in step S13 and L, A, B, K, and F read from the memory 52 in step S12 (S21). The control program 54 calculates J×{dX1(θ)/dt+dX2(θ)/dt}/2 obtained by multiplying {dX1(θ)/dt+dX2(θ)/dt}/2, which is the average value of dX1(θ)/dt and dX2(θ)/dt, by the above-described correction coefficient J (S22). In other words, the control program 54 calculates the payout speed of the wire 42 at which the hook block 62 maintains the above-described intermediate posture.

The control program 54 makes the derricking cylinder 36 extend at a predetermined speed so that the boom 32 stands at the constant angular velocity F (S23). The control program 54 makes the main winch 39 drive via the first hydraulic motor 38 so that the payout speed of the wire 42 becomes J×{dX1(θ)/dt+dX2(θ)/dt}/2 obtained by multiplying {dX1(θ)/dt+dX2(θ)/dt}/2 by the correction coefficient J (S24), and pays out the wire 42. The process of step S23 corresponds to a "first process" recited in the claims. The process of step S24 corresponds to a "second process" recited in the claims. The processes of steps S23 and S24 correspond to a "drive process" recited in the claims.

Next, the control program 54 calculates a payout length W of the wire 42 from the detection value detected by the wire sensor 28 (S25). The control program 54 determines whether the calculated payout length W is not smaller than J×X1(θ) and not larger than J×X2(θ) (S26). In other words, the control program 54 determines whether the wire 42 is paid out within a range in which the hook hardware 41 is not damaged and the irregular winding does not occur.

When determining that the payout length W is smaller than J×X1(θ) or larger than J×X2(θ) (S26: No), the control program 54 executes a stop process for stopping standing of the boom 32 and drive of the main winch 39 (S27), and finishes the boom extending process. Note that although not shown in the flowchart, the control program 54 performs an error notification based on executing of the stop process. The error notification is performed, for example, by displaying on a display (not shown) an error screen indicating that the boom extending process is stopped or outputting an error sound from a speaker (not shown).

When determining that the payout length W is not smaller than J×X1(θ) and not larger than J×X2(θ) (S26: Yes), the control program 54 determines whether the derricking angle θ obtained in step S13 reaches the predetermined standing angle φ stored in the memory 52 (S28). When determining that the derricking angle θ does not reach the predetermined standing angle φ (S28: No), the control program 54 executes processes of steps S131, S141, S211, and S221. The processes of steps S131, S141, S211 and S221 are the same process as the processes of steps S13, S14, S21 and S22. In other words, when the boom 32 does not reach the predetermined standing position (S28: No), the control program 54 obtains the derricking angle θ again, and generates or calculates the function dX1(θ), the function dX2(θ), dX1(θ)/dt, dX2(θ)/dt, and J×{dX1(θ)/dt+dX2(θ)/dt}/2. The control program 54 repeatedly executes a series of processes of steps S131, S141, S211, and S221 at a fixed time interval of, for example, several milliseconds to several tens of milliseconds until the boom 32 reaches the predetermined standing position. The process of step S141 corresponds to a "generation process" recited in the claims.

When determining that the derricking angle θ reaches the predetermined standing angle φ (S28: Yes), the control program 54 makes drive of the boom 32 and the main winch 39 stop via the derricking cylinder 36 and the first hydraulic motor 38 (S29), and finishes the boom extending process.

Next, the boom retracting process shown in FIG. 7 will be described. Note that as for the same processes as those described in the boom extending process (see FIG. 6), same reference numerals are assigned and descriptions thereof are omitted.

The control program 54 executes the processes from steps S11 to S22 described in the boom extending process. Next, the control program 54 makes the derricking cylinder 36 retract at a predetermined speed, and makes the boom 32 lie at the constant angular velocity F (S31).

The control program 54 makes the main winch 39 drive via the first hydraulic motor 38 so that the wind-up speed of the wire 42 becomes J×{dX1(θ)/dt+dX2(θ)/dt}/2 (S32). In other words, the control program 54 makes the main winch 39 wind up the wire 42 at a speed so that the hook block 62 maintains the intermediate posture (see FIG. 10).

The control program 54 executes the processes of the above-described steps S25, S26, and S27. When determining in step S26 that the payout length W is not smaller than J×X1(θ) and not larger than J×X2(θ) (S26: Yes), the control program 54 determines whether the derricking angle θ obtained in step S13 reaches zero (S33). In other words, the control program 54 determines whether the boom 32 is laid to a retracted position. When determining that the derricking angle θ does not reach zero (S33: No), the control program 54 executes the processes of steps S131, S141, S211, and S221. The processes of steps S131, S141, S211 and S221 are the same process as the processes of steps S13, S14, S21 and S22. In other words, when the boom 32 does not reach the retracted position (S33: No), the control program 54 obtains the derricking angle θ again, and generates or calculates the function dX1(θ), the function dX2(θ), dX1(θ)/dt, dX2(θ)/dt, and J×{dX1(θ)/dt+dX2(θ)/dt}/2. The control program 54 repeatedly executes a series of the processes of steps S131, S141, S211, and S221 at time intervals of, for example, several milliseconds to several tens of milliseconds until the boom 32 reaches the retracted position. The process of step S141 corresponds to a "generation process" recited in the claims.

When determining that the derricking angle θ reaches zero (S33: Yes), the control program 54 makes drive of the boom 32 and the main winch 39 stop through the derricking cylinder 36 and the first hydraulic motor 38 (S29), and finishes the boom retracting process.

Actions and Effects of Embodiment

In the present embodiment, the boom 32 is made to stand and lie while the hook block 62 is maintained in the intermediate posture between the pulled-up posture and the lying posture. Therefore, the boom 32 can be made to stand and lie while preventing the damage of the hook hardware 41 and occurrence of the irregular winding of the wire 42.

The controller 50 generates X1(θ) which is the allowable minimum distance and X2(θ) which is the allowable maximum distance, based on the boom length L, the first specified values (A, B), and the second specified value K in accordance with the type of the boom 32, the type of the hook block 62, and the type of the hook hardware 41. Therefore, irrespective of the type of the boom 32, the type of the hook block 62, and the type of the hook hardware 41, the allowable minimum distance X1(θ) and the allowable maximum distance X2(θ) can be calculated, and the target value can be set. As a result, the controller 50 can safely and automatically extend/retract the boom 32 irrespective of the type of the boom device 12. In other words, the controller 50 can be used with various boom devices.

In the boom extending process and the boom retracting process, the controller 50 makes the boom stand and lie so that the angular velocity de/dt of the boom 32 is constant (=F) (S23, S31). Therefore, a target for controlling drive in order for the payout length of the wire 42 to be the above-described target value can be limited to the first hydraulic motor 38. As a result, processing load on the CPU 51 is reduced.

The above-described target value is a value in accordance with the average value of X1(θ) and X2(θ). In other words, the wind-up allowance of the wire 42 until the damage of the hook hardware 41 is substantially the same as the payout allowance of the wire 42 until the irregular winding occurs. Therefore, occurrence of the damage of the hook hardware 41 and the occurrence of the irregular winding can be prevented to the same degree.

When the payout length W of the wire 42 is smaller than J×X1(θ) or larger than J×X2(θ) (S26: No), the controller 50 makes drive of the derricking cylinder 36 and the first hydraulic motor 38 stop (S27). Therefore, for example, even if a trouble occurs in the derricking cylinder 36, the first hydraulic motor 38, or the like, standing and lying of the boom 32 and drive of the main winch 39 are stopped safely. As a result, safety of an automatic extension and an automatic retraction of the boom 32 is improved.

The controller 50 determines the above-described target value based on the obtained number of hanging wires. Therefore, even if the hook block 62 has a specification that the number of hanging wires can be changed, the controller 50 can safely perform the automatic extension/retraction of the boom 32.

Modification Example 1

Figure 11:
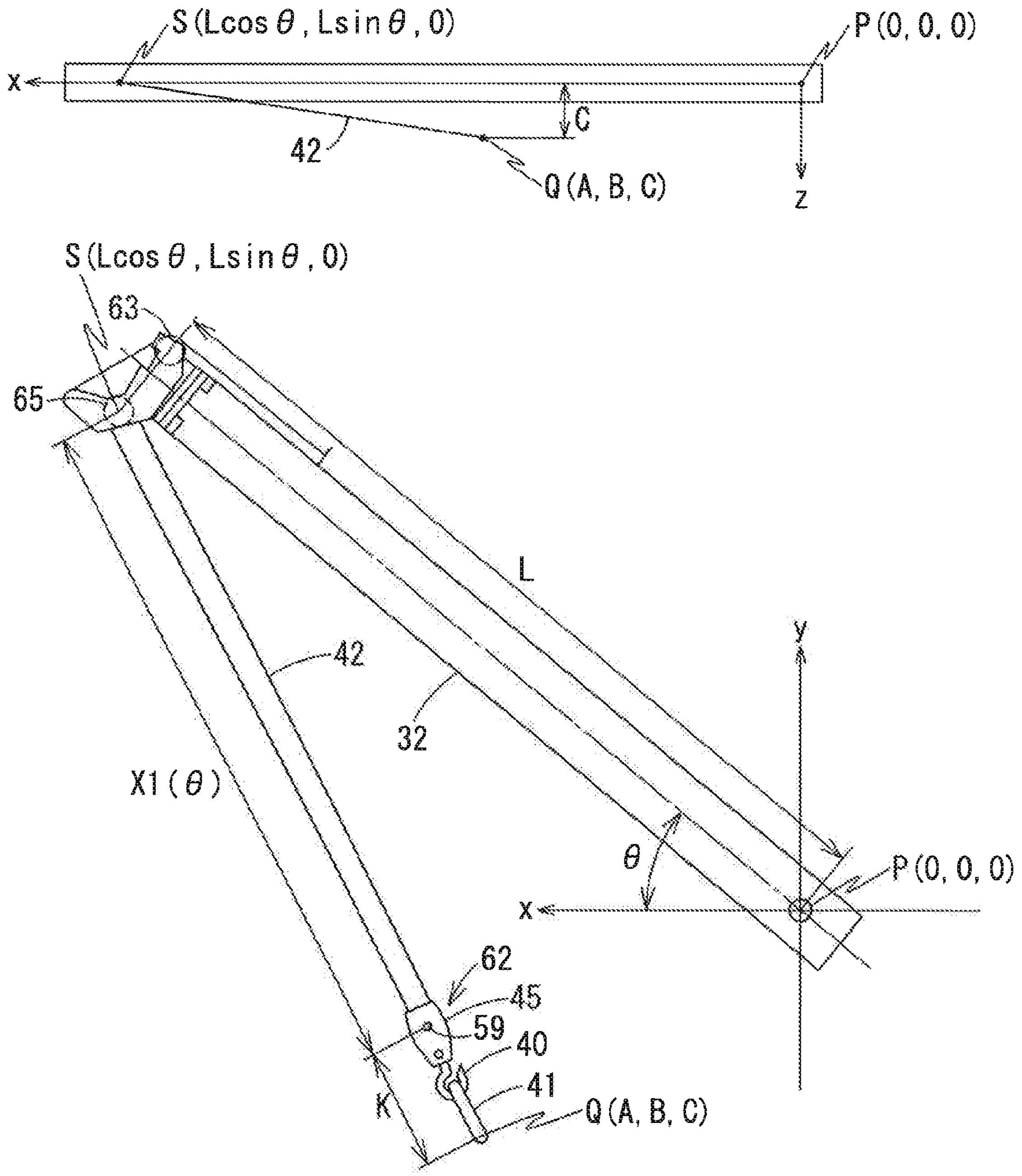
FIG. 11 is a diagram for explaining the function X1(θ) according to a modification example 1 of the one embodiment of the present invention.

In the above-described embodiment, an example is described in which the first specified values A and B (coordinates of the position Q of one end of the hook hardware 41 in the two-dimensional coordinate system taking the derricking center P as the origin) are stored in the memory 52. In the present modification example, as shown in FIG. 11, first specified values A, B, and C (coordinates of the position Q of one end of the hook hardware 41 in a three-dimensional coordinate system taking the derricking center P as the origin) are stored in the memory 52. The first specified value C indicates a coordinate related to a z-axis in the above-described three-dimensional coordinate system. The z-axis is an axis along a width direction of the truck crane 10.

Figure 12:
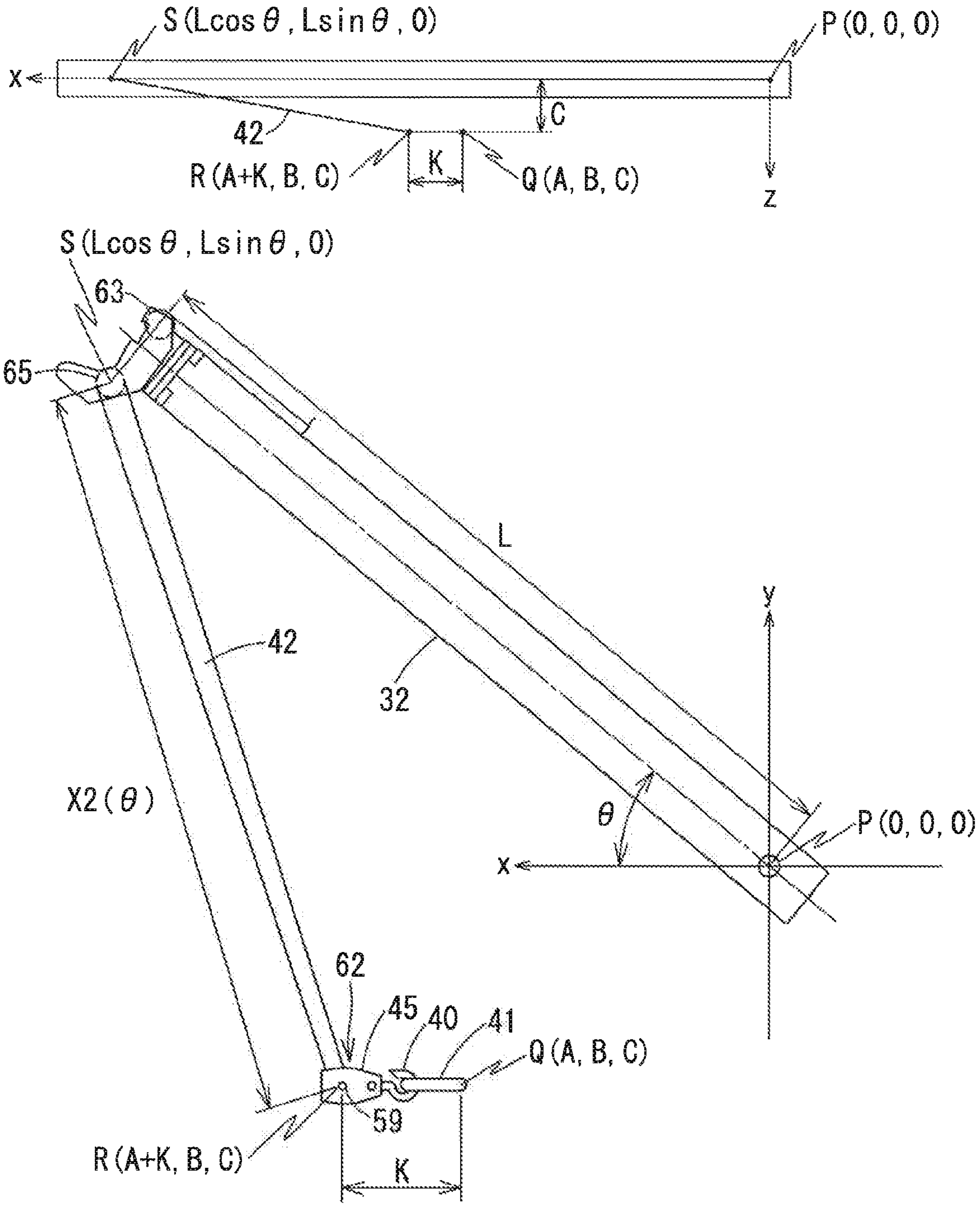
FIG. 12 is a diagram for explaining the function X2(θ) indicating a theoretical payout length of the wire 42 according to the modification example 1.

In the present modification example, the coordinates of the above-described point S (tip end position of the boom 32) are expressed as (L cos θ, L sin θ, 0). The function X1(θ) is a value obtained by subtracting the second specified value K from the distance SQ between the point Q and the point S, and is calculated using L, A, B, C, θ, and K. Similarly, as shown in FIG. 12, the function X2(θ) is the distance SR between the point R (connection position between the wire 42 and the load hanging hook 40) and the point S, and is calculated using L, A, B, C, K, and θ. The control program 54 has a class that generates the function X1(θ) and the function X2(θ) by inputting L, A, B, C, K, and θ. The control program 54 has a class that generates dX1(θ)/dt and dX2(θ)/dt by inputting L, A, B, C, K, θ, and F. In steps S14 and S21, the control program 54 generates X1(θ), X2(θ), dX1(θ)/dt, and dX2(θ)/dt using L, A, B, C, K, F, θ and the above-described classes.

In the present modification example, even if the tip end position of the boom 32 and the position of the hook hardware 41 are deviated in the width direction of the truck crane 10, accurate X1(θ), X2(θ), dX1(θ)/dt, and dX2(θ)/dt can be generated. As a result, even if the positions of the tip end of the boom 32 and the hook hardware 41 are deviated in the width direction of the truck crane 10, the damage of the hook hardware 41 and the occurrence of the irregular winding can be prevented.

Modification Example 2

In the present modification example, X1(θ), X2(θ), dX1(θ)/dt, and dX2(θ)/dt are corrected based on the derricking angle θ (see FIG. 13) of the boom 32.

Figure 13:
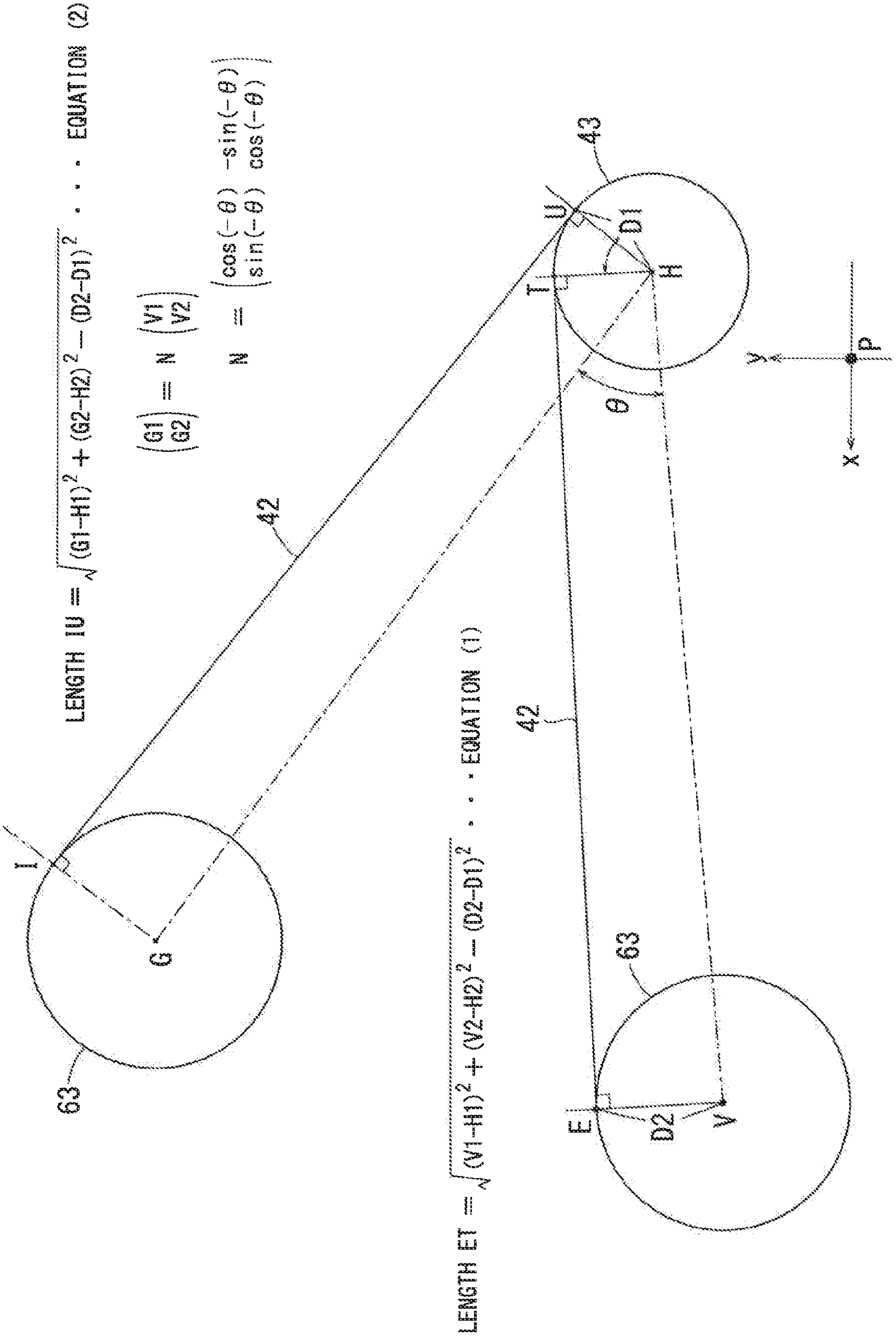
FIG. 13 is a diagram for explaining change amounts in the function X1(θ) and the function X2(θ) according to a modification example 2 of the one embodiment of the present invention.

As shown in FIG. 13, when the derricking angle of the boom 32 changes from 0 degrees to θ, a contact point between the wire 42 and the wire drum 44 changes from a contact point T to a contact point U. When the contact point moves in this manner, the function X1(θ) and the function X2(θ), which are the theoretical payout lengths of the wire 42, change. Change amounts in the function X1(θ) and the function X2(θ) due to the movement of the contact point correspond to a value obtained by subtracting the length of a straight line IU from the sum of the length of a straight line ET and the length of an arc TU. A point E is a point at which the wire 42 contacts the first sheave 63 when the boom 32 is in the lying position (derricking angle θ=0). A point I is a point at which the wire 42 contacts the first sheave 63 when the derricking angle of the boom 32 is θ.

The length of the straight line ET (hereinafter referred to as "length ET") can be calculated according to equation (1) shown in FIG. 13, from coordinates (H1, H2) of a center H of the winch sheave 43, a radius D1 of the winch sheave 43, coordinates (V1, V2) of a center V of the first sheave 63, and a radius D2 of the first sheave 63. Here, H1, H2, D1, V1, V2, and D2 are fixed values determined by the type of the boom device 12.

Furthermore, the length of the straight line IU (hereinafter referred to as "length IU") can be calculated according to equation (2) shown in FIG. 13, from the coordinates (H1, H2) of the center H of the winch sheave 43, the radius D1 of the winch sheave 43, coordinates (G1, G2) of a center G of the first sheave 63, and the radius D2 of the first sheave 63. Here, G1 and G2 can be calculated using a rotation matrix N, V1, and V2. In other words, the length IU can be calculated using H1, H2, D1, V1, V2, D2 and the derricking angle θ.

Furthermore, the length of the arc TU is D1×θ. Therefore, the change amounts (correction amounts) of the function X1(θ) and the function X2(θ) when the derricking angle of the boom 32 changes from 0 degrees to θ can be calculated using H1, H2, D1, V1, V2, D2, and the derricking angle θ.

The control program 54 has a class that generates the correction amounts as an instance, by inputting H1, H2, D1, V1, V2, and D2, which are values in accordance with the type of the boom device 12 and are stored in advance in the memory 52, and the derricking angle θ detected by the derricking angle sensor 27. The control program 54 corrects the function X1(θ) and the function X2(θ) by adding the correction amounts generated using the above-described class to the function X1(θ) and the function X2(θ). For example, dX1(θ)/dt and dX2(θ)/dt are generated by differentiating X1(θ) after the correction and X2(θ) after the correction with respect to time t, or by using the above-described class. The process in which the control program 54 corrects the function X1(θ) and the function X2(θ) using the correction amounts corresponds to a "correction process" recited in the claims.

In the present modification example, since the function X1(θ), the function X2(θ), dX1(θ)/dt, and dX2(θ)/dt are corrected using H1, H2, D1, V1, V2, and D2 in accordance with the type of the boom device 12 and the derricking angle θ of the boom 32, the damage of the hook hardware 41 and the occurrence of the irregular winding can be prevented more reliably.

Modification Example 3

Figure 14:
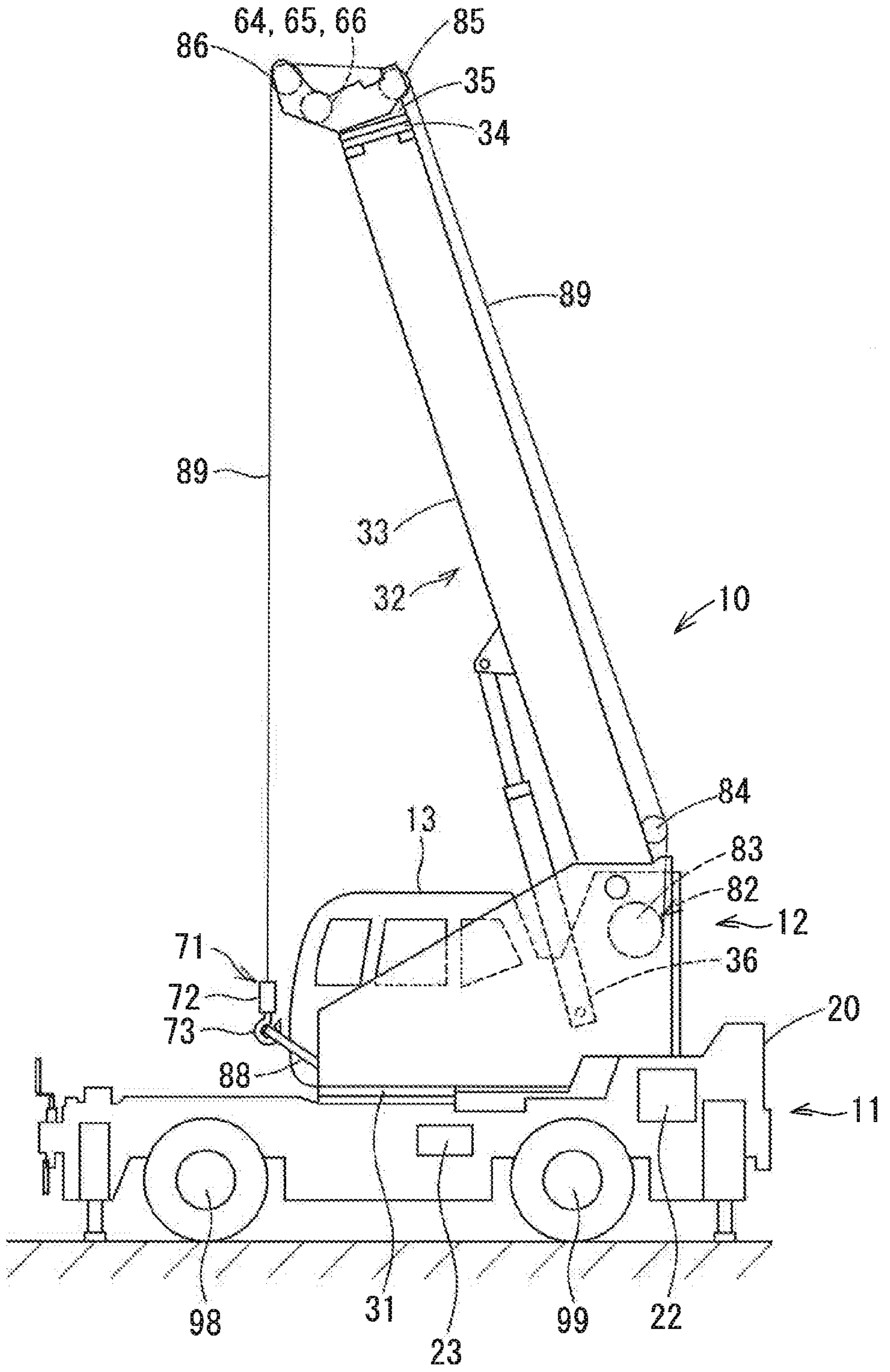
FIG. 14 is a schematic diagram of the truck crane 10 according to a modification example 3 of the one embodiment of the present invention.

In the present modification example, the boom device 12 further includes a second hydraulic motor 81, a sub winch 82, and a sub wire sensor 80 shown in FIG. 5, and sheaves 85, 86, a sub hook member 71, and a hook hardware 88 shown in FIG. 14. Note that illustration of the main winch 39, the winch sheave 43, the wire 42, the hook block 62, and the hook hardware 41 is omitted in FIG. 14.

The second hydraulic motor 81 rotates, receiving supply of the hydraulic pressure from the hydraulic supply device 24. The second hydraulic motor 81 corresponds to a "second actuator" recited in the claims.

As shown in FIG. 5, the sub winch 82 has a sub wire drum 83 rotated by the second hydraulic motor 81, a sub wire 89 wound up by the sub wire drum 83, and a sub winch sheave 84. The sub wire 89 pulled out from the sub wire drum 83 is wound around the sub winch sheave 84 and then is wound around the sheave 85. The sub winch 82 corresponds to a "winch" recited in the claims. The sub wire drum 83 corresponds to a "wire drum" recited in the claims.

The sheave 85 is provided to the tip end portion of the boom 32 to align side by side with the first sheave 63 in the horizontal direction (see FIG. 1). The sheave 86 is provided to the tip end portion of the boom 32 apart from the sheave 85. The sub wire 89 wound around the sheave 85 is wound around the sheave 86, and then is connected to the sub hook member 71.

The sub hook member 71 has a sub hook main body 72 and a sub hook 73. The sub hook 73 is coupled to the sub hook main body 72, and is hung on the hook hardware 88.

The sub hook member 71 does not have a wire sheave. In other words, the number of hanging wires of the sub wire 89 is always "1". The sub hook member 71 corresponds to a "hook member" recited in the claims. The sub hook 73 corresponds to a "load hanging hook" recited in the claims.

The hook hardware 88 is arranged side by side with the hook hardware 41 (see FIG. 1) in the horizontal direction. One end of the hook hardware 88 is rotatably supported by the slewing base 31. The sub hook 73 is hooked on the other end of the hook hardware 88. The hook hardware 88 corresponds to a "locking member" recited in the claims.

The sub wire sensor 80 (see FIG. 5) is a rotary encoder that detects a rotation amount of the sub wire drum 83, for example. The sub wire sensor 80 outputs a pulse signal having a voltage value that changes in accordance with the rotation of the sub wire drum 83. The sub wire sensor 80 is connected to the controller 50 by a signal line such as a cable. The controller 50 calculates the rotation amount of the sub wire drum 83 from the number of pulses input from the sub wire sensor 80, and calculates a payout length of the sub wire 89 based on the rotation amount of the sub wire drum 83 and a radius of the sub wire drum 83. The radius of the sub wire drum 83 is stored in advance in the memory 52.

Note that any type of sensor may be used for the sub wire sensor 80, as long as the controller 50 can obtain the payout length of the sub wire 89. The sub wire sensor 80 corresponds to a "wire sensor" recited in the claims.

In the present modification example, as shown in FIG. 5, in addition to a normal circuit (not shown) that supplies hydraulic oil having a predetermined pressure to the second hydraulic motor 81, the hydraulic supply device 24 includes a second relief circuit 93 that relieves the hydraulic oil in order to reduce the pressure of the supplied hydraulic oil to be smaller than the predetermined pressure. The second relief circuit 93 has a relief valve 94. The relief valve 94 switches a flow path between the normal circuit and the second relief circuit 93 by a drive signal input from the controller 50. In other words, the controller 50 can change the pressure of the hydraulic oil supplied to the second hydraulic motor 81 by inputting the drive signal to the relief valve 94. Note that when the first relief circuit 91 reduces the pressure of the hydraulic oil supplied to the second hydraulic motor 81 in addition to the first hydraulic motor 38 to be smaller than the predetermined pressure, the second relief circuit 93 may not be provided.

The memory 52 further stores α and β indicating coordinates of a point Q' at one end of the hook hardware 88 as the first specified values. The memory 52 further stores, as the second specified value, a length η in accordance with the length of the hook hardware 88 and the length of the sub hook member 71.

Figure 15:
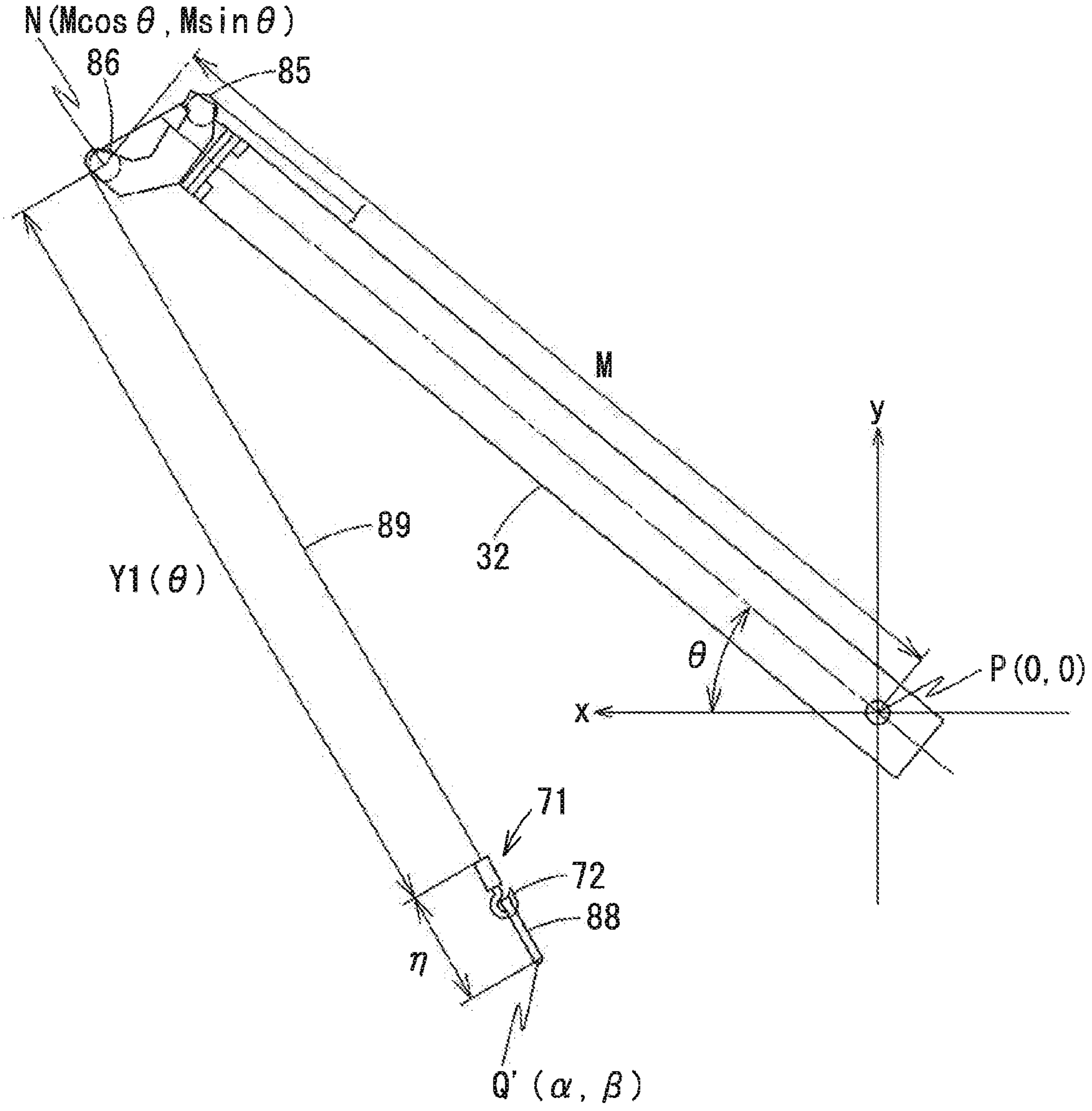
FIG. 15 is a diagram for explaining a function Y1(θ) indicating a theoretical payout length of a sub wire 89 in the modification example 3.

As shown in FIG. 15, assuming that the length from the base end of the boom 32 to the sheave 86 is a boom length M, coordinates of a point N indicating a position of the sheave 86 when the derricking angle of the boom is θ are expressed by (M cos θ, M sin θ). On the other hand, a function Y1(θ), which is a theoretical payout length of the sub wire 89 in the posture in which the sub wire 89 is pulled up, is a value obtained by subtracting η from the distance between the point N and the point Q'. Therefore, the function Y1(θ) can be expressed using the length M of the boom 32, the first specified values α and β, and the second specified value η.

Figure 16:
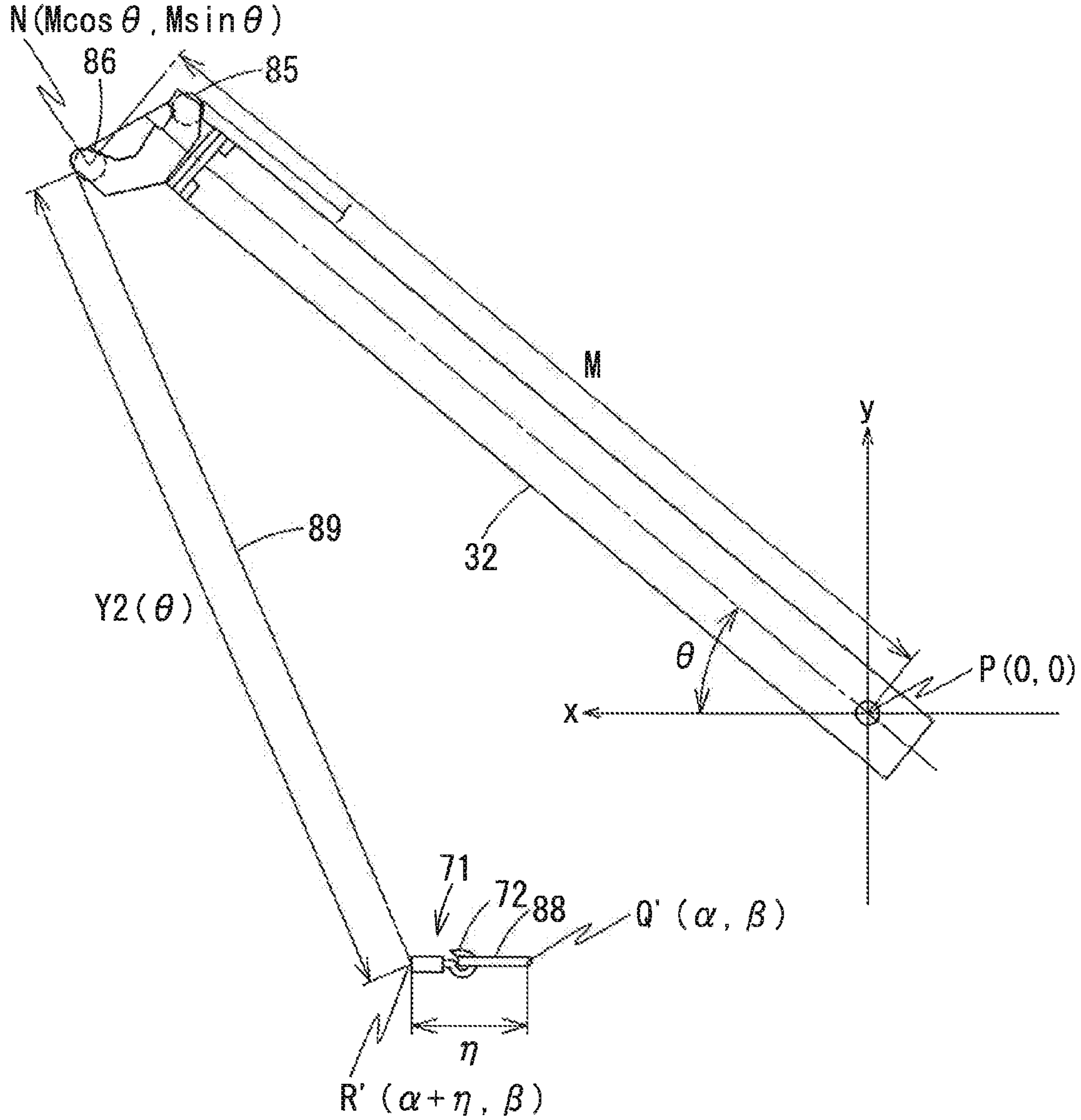
FIG. 16 is a diagram for explaining a function Y2(θ) indicating a theoretical payout length of the sub wire 89 in the modification example 3.

As shown in FIG. 16, a function Y2(θ), which is a theoretical payout length of the sub wire 89 in a posture in which the sub wire 89 is lying, is the distance between the point N and the point R'. Therefore, the function Y2(θ) can be expressed using the length M of the boom 32, the first specified values α and β, and the second specified value η. Note that when the boom length M is substantially the same as the boom length L, the boom length L may be used in place of the boom length M.

The control program 54 has a class that generates the functions Y1(θ), the function Y2(θ), dY1(θ)/dt, and dY2(θ)/dt. Note that the control program 54 may have a class that generates the function Y1(θ) and the function Y2(θ), and may generate dY1(θ)/dt and dY2(θ)/dt by differentiating the function Y1(θ) and the function Y2(θ) with respect to time t.

In step S12 (see FIG. 6), the control program 54 further reads the boom length M, the first specified values α and β, and the second specified value η from the memory 52. The control program 54 further generates Y1(θ) and Y2(θ) using M, α, β, η, and F read in step S12, the derricking angle θ obtained in step S13, and the above-described class. Then, in step S15, the control program 54 calculates the average value of Y1(θ) and Y2(θ) as the target value.

In step S16, the control program 54 switches the flow path of the hydraulic oil from the above-described normal circuit to the second relief circuit 93, and the pressure of the hydraulic oil supplied to the second hydraulic motor 81 is set to be smaller than the predetermined pressure. In steps S17 and S18, the control program 54 makes the sub winch 82 drive via the second hydraulic motor 81 so that the sub wire 89 is paid out by the target value. In other words, the control program 54 sets the sub hook member 71 in the intermediate posture in the same manner as the hook block 62. In step S20, the control program 54 switches the flow path of the hydraulic oil from the first relief circuit 91 and the second relief circuit 93 to the normal circuit.

In step S21, the control program 54 further generates dY1(θ)/dt and dY2(θ)/dt. The control program 54 further calculates {dY1(θ)/dt+dY2(θ)/dt}/2 in step S22, and in step S24, makes the sub wire drum 83 rotate at a rotation speed at which the sub wire 89 is paid out at {dY1(θ)/dt+dY2(θ)/dt}/2. In other words, the control program 54 makes the sub winch 82 drive so that the sub hook member 71 maintains the intermediate posture.

In step S25, the control program 54 further obtains a payout length l of the sub wire 89 detected by the sub wire sensor 80. In step S26, the control program 54 further determines whether the obtained payout length l is not smaller than Y1(θ) and not larger than Y2(θ). When determining that Y1(θ)≤l≤Y2(θ) is not true (S26: No), the control program 54 executes the stop process (S27), and when determining that Y1(θ)≤l≤Y2(θ) is true (S26: Yes), the control program 54 executes processes after step S28.

In the present modification example, even in the truck crane 10 including the hook block 62, which is a so-called main hook, and the sub hook member 71, the occurrence of the irregular winding can be prevented in both winches, which are the main winch 39 and the sub winch 82, and the damage of the hook hardware 41, 88 can be prevented.

Note that the truck crane 10 may have the sub hook member 71 together with the hook block 62, or may have the sub hook member 71 in place of the hook block 62.

Other Modification Examples

In the above-described embodiment, the coordinates of the above-described point S are expressed by (L cos θ, L sin θ) using the length L and the derricking angle θ of the boom 32. However, the function X1(θ) and the function X2(θ) may be generated, taking the center of the first sheave 63 as (L cos θ, L sin θ) and taking the coordinates of the point S as (L cos θ+G1, L sin θ+G2). Here, "G1" and "G2" are differences between the center of the first sheave 63 and the center of the second sheave 65, and are stored in advance in the memory 52 as constants.

In the above-described embodiment, in steps S23 and S31, the derricking cylinder 36 is extended and retracted at a predetermined speed so that the boom 32 stands and lies at the constant angular velocity F. However, the derricking cylinder 36 may be extended and retracted at a constant speed. In that case, an angular velocity (de/dt) of the boom 32 is calculated from an extension/retraction speed of the derricking cylinder 36, the calculated angular velocity is used in place of the above-described angular velocity F (constant), and dX1(θ)/dt and dX2(θ)/dt are generated or calculated.

Furthermore, in steps S23 and S31, the boom 32 may be made to stand and lie by the steering device 15 operated by an operator. In that case, the control program 54 makes the derricking cylinder 36 stand and lie at a derricking speed (angular velocity) based on a signal input from the steering device 15 and in accordance with the operation amounts of the operator. The angular velocity (de/dt) is used in place of the above-described angular velocity F, and $dX1(\theta)/dt$ and $dX2(\theta)/dt$ are generated or calculated.

In the above-described embodiment, a value in accordance with the average value of the allowable minimum distance $X1(\theta)$ and the allowable maximum distance $X2(\theta)$ is calculated as the target value. However, a value closer to the allowable minimum distance $X1(\theta)$ may be taken as the target value, or a value closer to the allowable maximum distance $X2(\theta)$ may be taken as the target value. For example, $J\times\{X1(\theta)+X2(\theta)\}\times 2/3$ or $J\times\{X1(\theta)+X2(\theta)\}\times 1/3$ may be taken as the target value.

In the above-described embodiment, the first specified values A and B indicating the coordinates of the above-described point Q are stored in the memory 52. However, if the function $X1(\theta)$ and the function $X2(\theta)$ can be generated, other values may be stored in the memory 52 as the first specified values in place of the first specified values A and B. For example, the distance from the point P, which is the origin, to the point Q, and a predetermined angle may be stored in the memory 52. Here, the predetermined angle is an angle (angle of depression) formed by the straight line PQ and the horizontal plane, for example.

In the above-described embodiment, the hook hardware 41 is rotatably provided to the slewing base 31. However, the hook hardware 41 may be fixed to the slewing base 31. In this case, the position of the other end of the hook hardware 41 is taken as the point Q, and the second specified value K is taken as the length of the hook block 62. Therefore, even when the hook hardware 41 is fixed to the slewing base 31, the controller 50 can prevent the damage of the hook hardware 41 and the occurrence of the irregular winding of the wire 42 in the boom extending process and the boom retracting process.

Furthermore, the hook hardware 41 may be provided to a member other than the slewing base 31, such as the vehicle body 20, or the cabin 13.

Furthermore, the hook block 62 may be directly hooked to be locked to a bar or the like provided to the slewing base 31, the vehicle body 20, the cabin 13, or the like without using the hook hardware 41. In that case, the function $X1(\theta)$, the function $X2(\theta)$, and the like are calculated, taking the position of the bar as the point Q and setting the second specified value K=0.

The invention claimed is:

1. A controller mounted on a boom device comprising:
- a pedestal;
- a boom supported by the pedestal and capable of performing a derricking motion between a lying position and a predetermined standing position;
- a winch having a wire wound up by a wire drum and wound around a tip end portion of the boom;
- a hook member having a load hanging hook provided to the wire;
- a first actuator configured to make the boom stand and lie;
- a second actuator configured to drive the winch;
- a locking member provided to the pedestal, wherein the load hanging hook is locked to the locking member;
- a derricking angle sensor configured to output a detection value in accordance with a derricking angle of the boom; and
- a wire sensor configured to output a detection value in accordance with a payout length of the wire, wherein
- the controller has a memory configured to store in advance a length of the boom, a first specified value in accordance with a position of the locking member taking a derricking center of the boom as a reference, and a second specified value in accordance with at least one of a type of the hook member and a type of the locking member, and
- the controller is configured to execute:
- a generation process for generating an allowable minimum distance and an allowable maximum distance from a tip end reference position of the boom to the hook member, based on the derricking angle of the boom specified from the detection value of the derricking angle sensor, the length of the boom, the first specified value, and the second specified value, and
- a drive process for making the first actuator and the second actuator drive so that the payout length of the wire specified from the detection value of the wire sensor becomes a predetermined target value that is not smaller than the allowable minimum distance and not larger than the allowable maximum distance.

2. The controller according to claim 1, wherein:
- the allowable minimum distance is a distance from the tip end portion of the boom to the hook member in a posture in which the wire is wound up and the hook member is pulled up, and
- the allowable maximum distance is a distance from the tip end portion of the boom to the hook member in a posture in which the hook member is lying.

3. The controller according to claim 1, wherein the drive process includes:
- a first process for making the boom stand and lie at a predetermined speed, and
- a second process for making the second actuator drive so that the payout length of the wire specified from the detection value of the wire sensor becomes the predetermined target value.

4. The controller according to claim 1, wherein the predetermined target value is an average value of the allowable maximum distance and the allowable minimum distance.

5. The controller according to claim 1, wherein the controller is configured to further execute a stop process for stopping the drive process, based on determining that the payout length of the wire specified from the detection value of the wire sensor is outside a range from the allowable minimum distance to the allowable maximum distance.

6. The controller according to claim 1, wherein the controller is configured to further execute an obtaining process for obtaining a number of hanging wires, and to determine the predetermined target value based on the number of hanging wires.

7. The controller according to claim 1, wherein the controller is configured to further execute a correction process for correcting the allowable minimum distance and the allowable maximum distance, based on the derricking angle specified from the detection value of the derricking angle sensor and a radius of a winch sheave stored in the memory.

8. A boom device comprising:
- the controller according to claim 1; and
- the pedestal; the boom; the winch; the hook member; the first actuator; the second actuator; the locking member; the derricking angle sensor; and the wire sensor.

9. A truck crane comprising the boom device according to claim 8.

* * * * *